US012397302B2

(12) United States Patent
Arnold et al.

(10) Patent No.: US 12,397,302 B2
(45) Date of Patent: Aug. 26, 2025

(54) ELECTROMAGNETIC ASSEMBLIES FOR PROCESSING FLUIDS

(71) Applicant: DH Technologies Development Pte. Ltd., Singapore (SG)

(72) Inventors: Don W. Arnold, Livermore, CA (US); Thomas R. Covey, Newmarket (CA); Yves LeBlanc, Newmarket (CA); Chang Liu, Richmond Hill (CA); John L. Campbell, Milton (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 0 days.

(21) Appl. No.: 15/779,933

(22) PCT Filed: Nov. 29, 2016

(86) PCT No.: PCT/IB2016/057189
§ 371 (c)(1),
(2) Date: May 30, 2018

(87) PCT Pub. No.: WO2017/093896
PCT Pub. Date: Jun. 8, 2017

(65) Prior Publication Data
US 2018/0369831 A1 Dec. 27, 2018

Related U.S. Application Data

(60) Provisional application No. 62/261,065, filed on Nov. 30, 2015, provisional application No. 62/286,196, (Continued)

(51) Int. Cl.
B03C 1/033 (2006.01)
B01F 33/451 (2022.01)
(Continued)

(52) U.S. Cl.
CPC ............ *B03C 1/288* (2013.01); *B01F 33/451* (2022.01); *B03C 1/01* (2013.01); *B03C 1/0335* (2013.01);
(Continued)

(58) Field of Classification Search
CPC ...... B01F 13/0809; B01F 33/451; B03C 1/01; B03C 1/0335; B03C 1/288; B03C 1/30;
(Continued)

(56) References Cited

U.S. PATENT DOCUMENTS 4,988,618 A * 1/1991 Li ............................ B03C 1/288
435/6.13
5,458,785 A 10/1995 Howe et al.
(Continued)

FOREIGN PATENT DOCUMENTS

| DE | 102008011050 A1 | 9/2009 | |
| DE | 102013009773 A1 | 12/2014 | |
| DE | 202014004711 U1 * | 7/2015 | .......... B01F 13/0818 |
| EP | 2105202 A1 | 9/2009 | |
| WO | 91-09308 A1 | 6/1991 | |
| WO | 2015128725 A1 | 9/2015 | |

OTHER PUBLICATIONS

International Search Report and Written Opinion for PCT/IB2016/057189 mailed Mar. 6, 2017.
(Continued)

*Primary Examiner* — Christopher L Chin
*Assistant Examiner* — Ellis Lusi
(74) *Attorney, Agent, or Firm* — Potomac Law Group, PLLC; Reza Mollaaghababa; Ido Rabinovitch

(57) ABSTRACT

Methods and apparatus for processing fluids are described. In various aspects, a fluid processing system may include a magnetic assembly that includes a plurality of magnetic structures configured to generate a magnetic field gradient within a fluid container. The magnetic structures may be formed as a plurality of electromagnets configured to be individually actuated by a controller. Each of the electro-
(Continued)

magnets may generate a magnetic field within the fluid container. The electromagnets may be differentially actuated to create a magnetic field gradient within the fluid container to agitate, mix, or otherwise influence magnetic particles disposed within the fluid container. Activation of the electromagnets of an electromagnetic structure may generate a magnetic field gradient that influences magnetic particles in an x-y direction. In addition, activation of the electromagnets of a plurality of electromagnetic structures may generate magnetic field gradients that influences magnetic particles in an x-y direction and z-direction.

8 Claims, 19 Drawing Sheets

Related U.S. Application Data filed on Jan. 22, 2016, provisional application No. 62/426,706, filed on Nov. 28, 2016.

(51) Int. Cl.
  *B03C 1/01*  (2006.01)
  *B03C 1/28*  (2006.01)
  *B03C 1/30*  (2006.01)
  *G01N 1/38*  (2006.01)
  *G01N 35/00*  (2006.01)

(52) U.S. Cl.
  CPC .............. *B03C 1/30* (2013.01); *G01N 1/38* (2013.01); *B03C 2201/18* (2013.01); *B03C 2201/20* (2013.01); *B03C 2201/26* (2013.01); *G01N 2001/386* (2013.01); *G01N 35/0098* (2013.01)

(58) Field of Classification Search
  CPC ............ B03C 2201/18; B03C 2201/20; B03C 2201/26; G01N 1/38; G01N 2001/386; G01N 35/0098
  USPC ......... 436/526, 809, 806; 435/288; 422/407; 310/10, 11; 366/273
  See application file for complete search history.

(56) References Cited

U.S. PATENT DOCUMENTS

| | | | |
|---|---|---|---|
| 6,231,760 | B1 | 5/2001 | Siddiqi |
| 6,879,067 | B1* | 4/2005 | Rockwell ............... H02K 33/04 |
| | | | 310/12.04 |
| 8,142,892 | B2 | 3/2012 | Rida |
| 8,361,316 | B2 | 1/2013 | Siddiqi |
| 8,585,279 | B2 | 11/2013 | Rida |
| 8,870,446 | B2 | 10/2014 | Rida |
| 8,999,732 | B2 | 4/2015 | Rida |
| 9,132,422 | B2 | 9/2015 | Rida et al. |
| 9,157,841 | B2 | 10/2015 | Rida |
| 9,354,148 | B2 | 5/2016 | Rida |
| 9,689,881 | B2 | 6/2017 | Rida et al. |
| 2004/0229346 | A1* | 11/2004 | Kohara ............... G01N 35/0098 |
| | | | 435/287.2 |
| 2010/0158657 | A1 | 6/2010 | Maekawa et al. |
| 2010/0200405 | A1* | 8/2010 | Lenz ...................... B03C 1/288 |
| | | | 204/600 |
| 2012/0061302 | A1* | 3/2012 | Siddiqi ............... B01F 13/1013 |
| | | | 210/138 |
| 2015/0056611 | A1 | 2/2015 | Rida |
| 2016/0001284 | A1 | 1/2016 | Rida et al. |
| 2017/0336424 | A1 | 11/2017 | Rida et al. |

OTHER PUBLICATIONS

Written Opinion for International Application No. PCT/IB2007/052409 dated Feb. 13, 2008.
International Preliminary Report on Patentability for International Application No. PCT/IB2007/052409 dated Dec. 22, 2008.
International Preliminary Report on Patentability for International Application No. PCT/IB2007/052410 dated Dec. 22, 2008.
International Search Report for International Application No. PCT/IB2007/052409 dated Feb. 13, 2008.
International Search Report for International Application PCT/IB2007/052410 dated Jul. 30, 2008.
Written Opinion for International Application No. PCT/IB2007/052410 dated Jul. 30, 2008.
Communication pursuant to Article 94(3) EPC for European Patent Application No. 16870083.9 mailed Mar. 12, 2024.

* cited by examiner

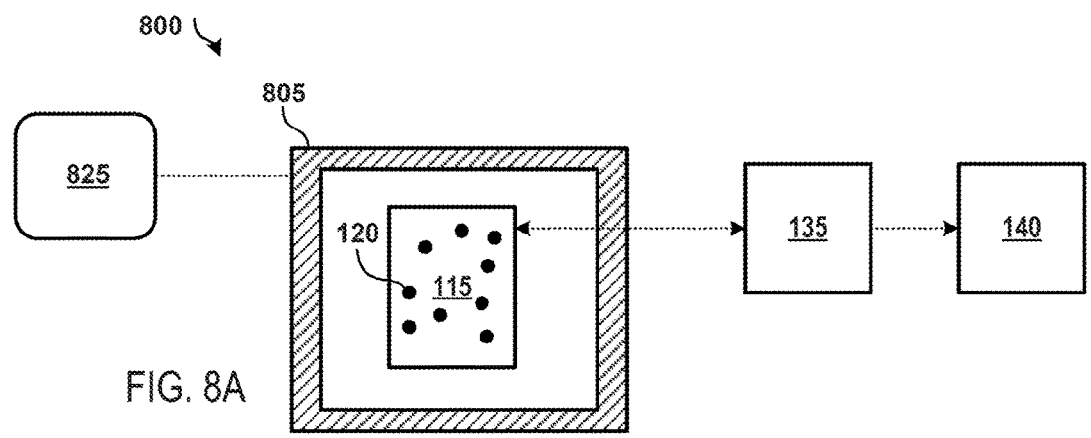
FIG. 8A
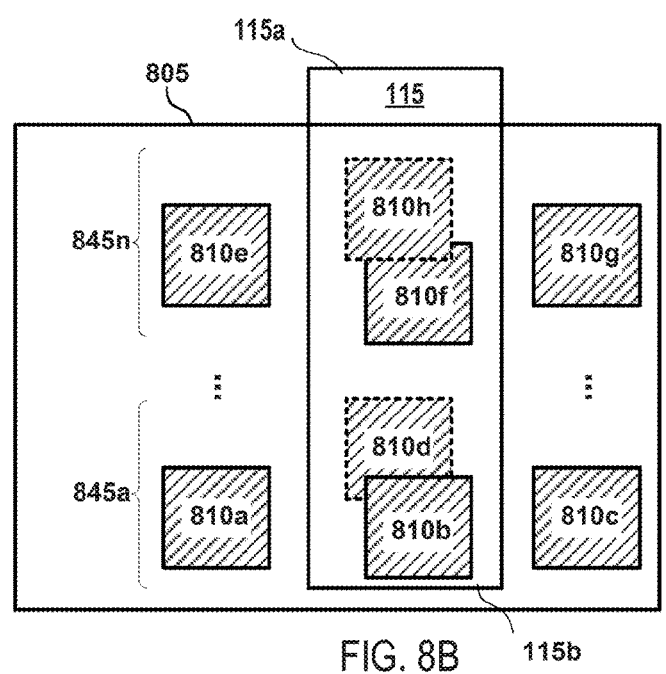
FIG. 8B
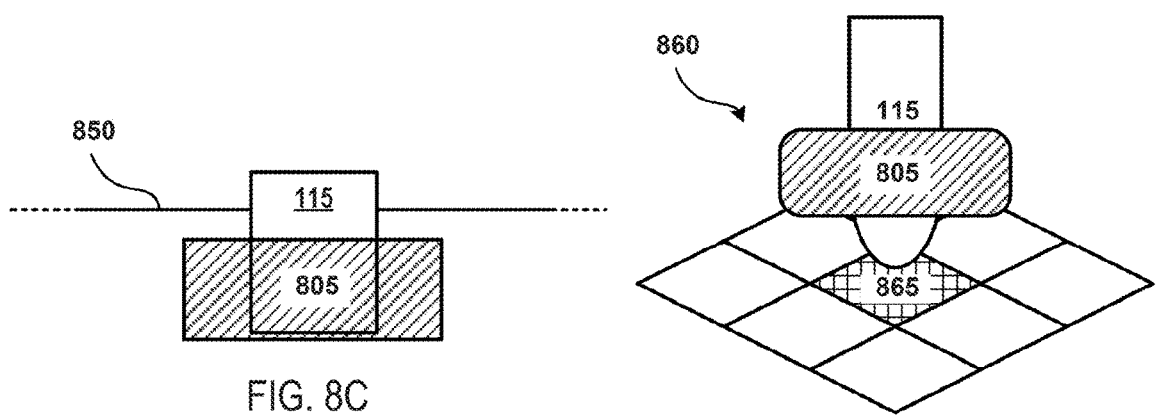
FIG. 8C
FIG. 8D

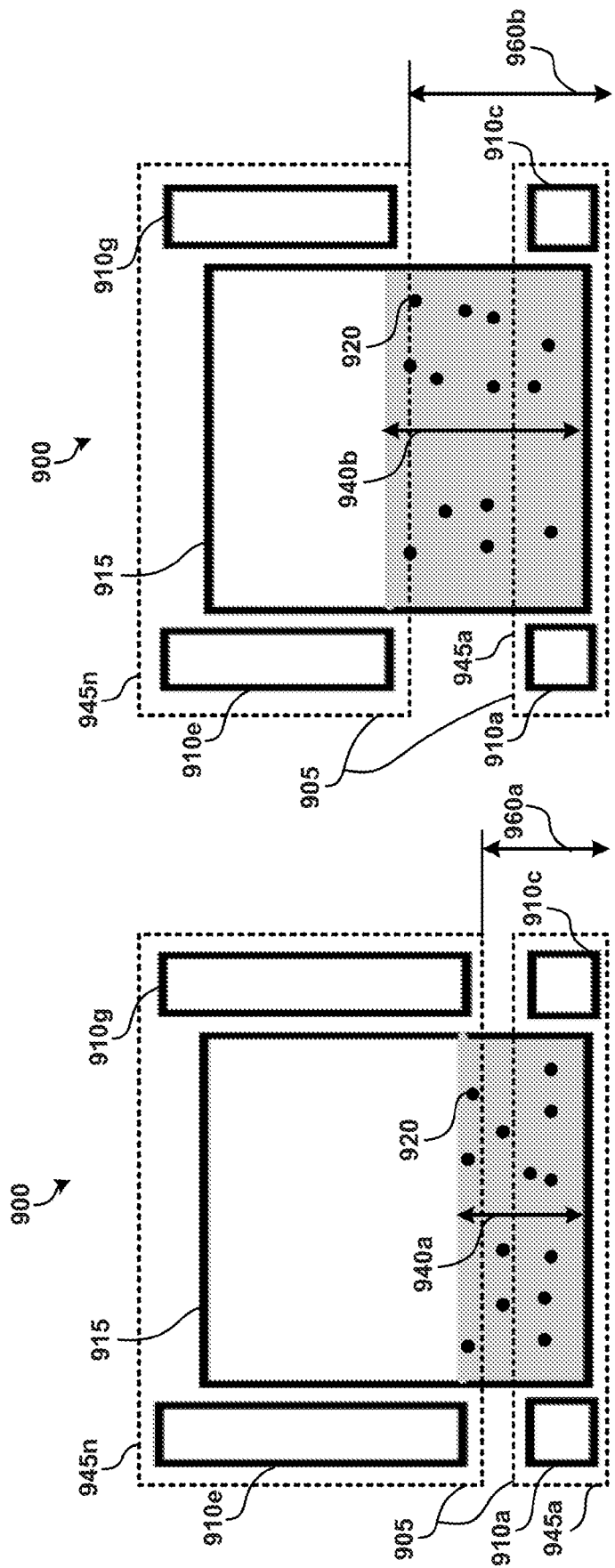

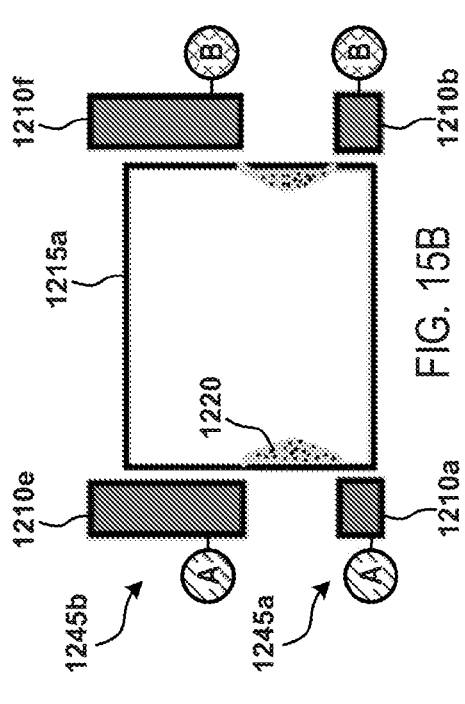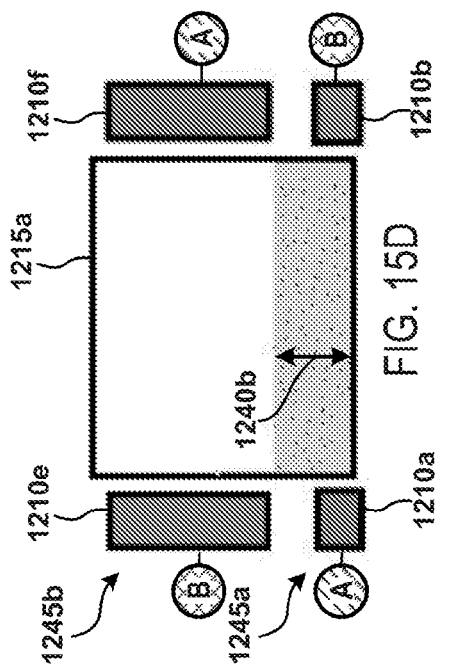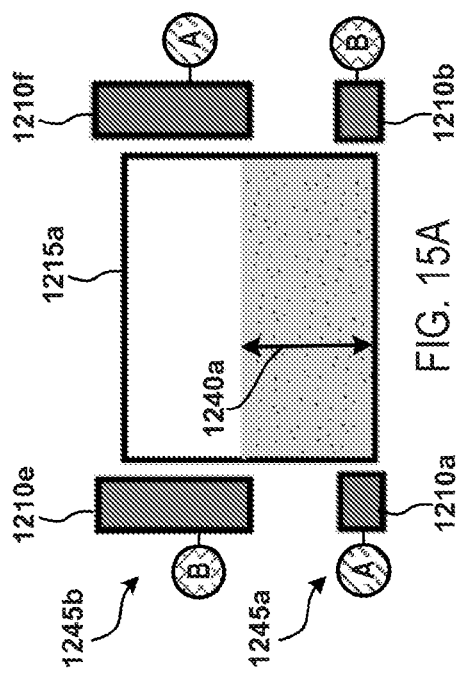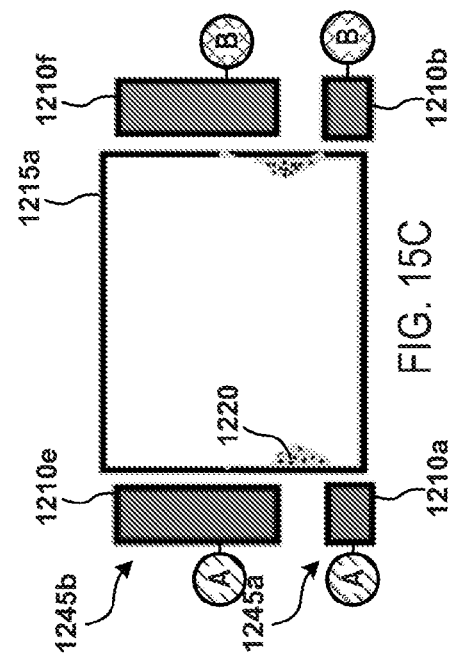

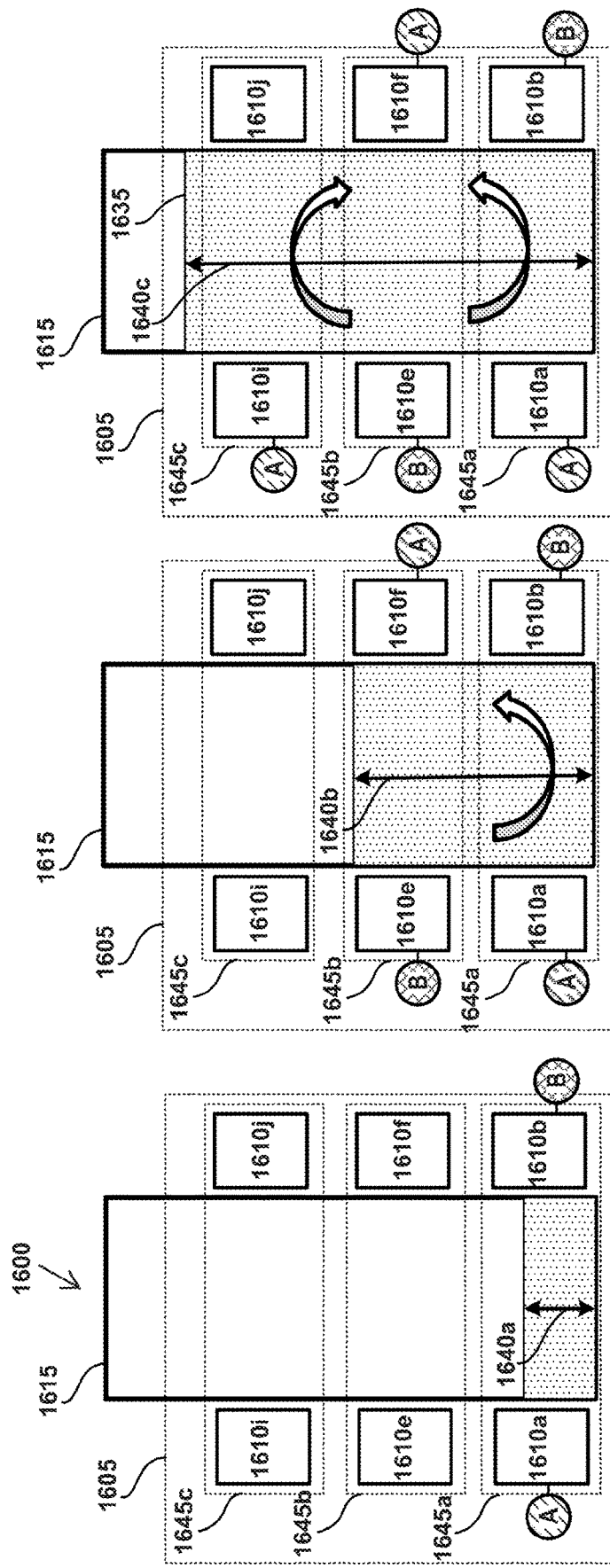

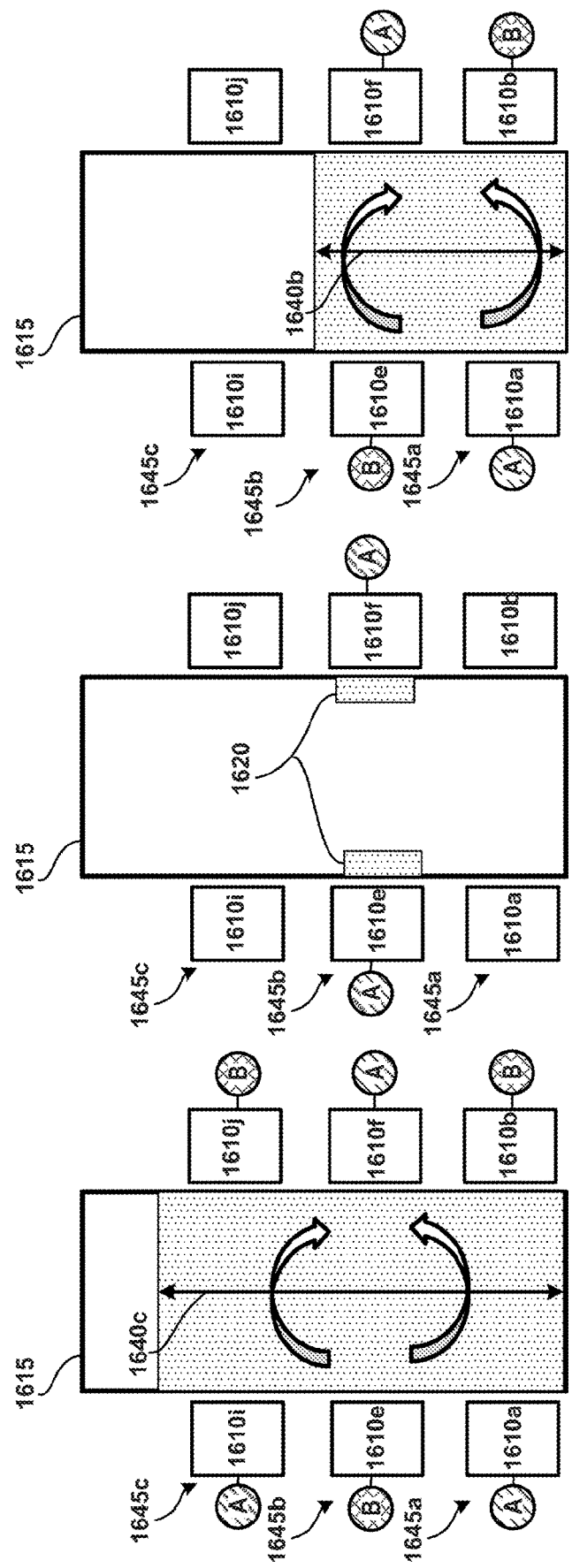

ELECTROMAGNETIC ASSEMBLIES FOR PROCESSING FLUIDS

RELATED APPLICATIONS

This application claims the benefit of priority from U.S. Provisional Application Ser. No. 62/261,065, filed on Nov. 30, 2015, U.S. Provisional Application Ser. No. 62/286,196, filed on Jan. 22, 2016 and U.S. Provisional Application Ser. No. 62/426,706, filed on Nov. 28, 2016, the contents of all of which are incorporated by reference in their entirety herein.

FIELD

The present teachings generally relate to processing fluids and, more particularly, to methods and apparatus for processing fluids using electromagnetic structures configured to manipulate magnetic particles disposed within the fluids.

INTRODUCTION

The preparation of samples is a critical phase of chemical and biological analytical studies. In order to achieve precise and reliable analyses, target compounds must be processed from complex, raw samples and delivered to analytical equipment. For example, proteomic studies generally focus on a single protein or a group of proteins. Accordingly, biological samples are processed to isolate a target protein from the other cellular material in the sample. Additional processing is often required, such as protein isolation (e.g., immunoprecipitation), matrix cleanup, digestion, desalting. Non-target substances such as salts, buffers, detergents, proteins, enzymes, and other compounds are typically found in chemical and biological samples. These non-target substances can interfere with an analysis, for example, by causing a reduction in the amount of target signal detected by analytical equipment. As such, complex, raw samples are typically subjected to one or more separation and/or extraction techniques to isolate compounds of interest from non-target substances.

Liquid chromatography (LC) is a typical solution-based technique for the separation of an analyte of interest present in a complex mixture of different substances. LC generally involves running a liquid sample over a solid, insoluble matrix. The liquid sample may include an analyte of interest having an affinity for the matrix under certain conditions, for example, pH, salt concentration, or solvent composition conditions. During LC, the chemical components in a mixture may be carried through a stationary phase by the flow of a liquid mobile phase. Separation in liquid chromatography occurs due to differences in the interactions of the analytes with both the mobile and stationary phases. High performance liquid chromatography (HPLC) is a form of LC in which an analyte is forced through the stationary phase in a liquid mobile phase at high pressure. Forcing the analyte using high pressure decreases the time the separated components remain on the stationary phase and, therefore, the time the components have to diffuse within the column. HPLC typically results in processed samples that may be used by analytical equipment to achieve better resolution and sensitivity compared with conventional LC techniques. However, LC is a complex technique that is costly to use for processing samples and is a serial process such that multiple, parallel columns are required to process a plurality of samples simultaneously. In addition, LC may irreversibly adsorb and/or co-elute certain potential target materials. Although HPLC is faster than LC (typically requiring about 10-30 minutes to process a sample), the complexity and cost of HPLC is much greater than conventional LC, for example, due to pumps and other specialized equipment required to carry out the process.

Magnetic particles or beads are another technology that may be employed for sample preparation for chemical and biological assays and diagnostics. Illustrative magnetic particles have been described in U.S. Pat. No. 4,582,622 and U.S. Pat. No. 4,628,037. Examples of devices and methods employing magnetic particles for sample separation and extraction are described in U.S. Pat. No. 4,554,088 and U.S. Pat. No. 8,361,316. Such magnetic particles have also been used in microfluidic systems, such as disclosed in an article entitled "Magnetic bead handling on-chip: new opportunities for analytical applications," authored by Martin A. M. Gijs and published in Microfluid Nanofluid (2004; I: 22-40).

Magnetic particle technology is a robust technology that provides for high performance (e.g., device sensitivity and accuracy) and also provides for easy automation of assay protocols. In some applications, the surface of magnetic particles is coated with a suitable ligand or receptor, such as C18, antibodies, lectins, oligonucleotides, or affinity groups, which can selectively bind a target substance or a group of analytes in a mixture with other substances. In some applications, the mass transfer of components from one substrate to another substrate is another consideration. One key element in magnetic particle separation and handling technology is efficient mixing to enhance the reaction rate between the target substances and the particle surfaces, the mass transfer from one substrate to another or the transfer of an analyte from one medium to another. Suspended magnetic particles may be actuated by magnetic forces, resulting in agitation of a sample solution to enhance or generate mixing processes. Examples of magnetic particle mixing systems have been disclosed in an article entitled "A chaotic mixer for magnetic bead-based micro cell sorter," authored by Suzuki et al. and published in the Journal of Microelectromechanical Systems (2004; I: 13:779-790) and an article entitled "A rapid magnetic particle driven micromixer," authored by Wang et al. and published in Microfluid Nanofluid (2008; I: 4:375-389).

Previous techniques for mixing fluids using magnetic particles, such as disclosed in U.S. Pat. No. 6,231,760, U.S. Pat. No. 6,884,357, and U.S. Pat. No. 8,361,316, have involved moving a magnet relative to a stationary container or moving the container relative to a stationary magnet using mechanical means to induce relative displacement of a magnetic field gradient within the container. The displacement of magnetic field gradients using such methods may cause some mixing within the container by inducing the magnetic particles to move continuously with the change of the magnet position. However, the formation of the magnetic field gradient within the container may attract and confine the particles in regions close to the walls of the container, which reduces mixing efficiency and effectiveness. Another technique described in International Patent Application Publication No. WO 1991/09308 involves the use of two electromagnets facing each other around a chamber having magnetic particles arranged therein. Sequentially energizing and de-energizing the two electromagnets (i.e., binary on/off control) at a sufficient frequency operates to suspend the magnetic particles within a fluid disposed in the chamber. The movement of particles resulting from actuating the two electromagnets according to this method is limited to a small area within the chamber and generates relatively weak mixing forces. In addition, a portion of the magnetic particles may not be effected by the magnetic fields. The non-effected particles aggregate near chamber surfaces and do not contribute to mixing or affinity binding.

U.S. Pat. No. 8,585,279 discloses a microfluidic chip device (the "MagPhase" device of Spinomix SA) that employs radio frequency (RF) driven electromagnets in combination with integrated pumps and fluidic channels to actuate magnetic particles within an enclosed sample container. The electromagnets are actuated in a sequence configured to vary a magnetic field gradient within the sample container to effectuate the movement of the magnetic particles within a sample fluid. However, the mixing of samples using the MagPhase device is inherently serial in nature as the configuration of the microfluidic device only allows for the processing of a limited number of samples simultaneously. In addition, as with other conventional techniques, the MagPhase device only provides sample mixing in one dimension, namely, in an x-y plane. Due to the particular configuration, the MagPhase device experiences relatively large sample volume loss and magnetic particle loss. Furthermore, the enclosed channels and sample container of the MagPhase microfluidic device introduces a barrier to automation of the loading and collection of sample volumes from the device and limits the sample volumes capable of being processed. Samples processed using the MagPhase device are necessarily exposed to a large contact surface area as they are required to travel through the various channels and fluidic paths of the device. Accordingly, samples processed via the MagPhase device are susceptible to high carry-over and low recoveries, for example, due to non-specific binding.

Magnetic particles have also been used in sample plate applications, such as the SISCAPA technique described in an article entitled "Mass spectrometric quantitation of peptides and proteins using Stable Isotope Standards and Capture by Anti-Peptide Antibodies (SISCAPA)," authored by Anderson et al. and published in the Journal of Proteome Research (2004; I: 3:235-244). Exemplary magnetic sample plate systems include the Agencourt SPRIPlate 96R-Ring Super Magnet Plate provided by Beckman Coulter, Inc. of Brea, Calif., United States and the Magnum FLX provided by Alpaqua® of Beverly, Mass., United States. In these applications, the sample plates include a plurality of fixed-field magnets arranged such that the magnets either protrude between the sample wells or allow the sample wells to be positioned within ring-shaped magnets. Magnetic particles within the sample wells may be agitated to promote mixing and the magnetic particles can then be trapped through the influence of the permanent magnets. Other types of automated mixing devices generally attempt to achieve mixing by mechanical agitation (i.e., by shaking the sample plate). After processing the samples, the magnets may be used to confine the beads to the side of the sample wells to allow for the removal of the sample fluid. However, the fixed-field magnets used in conventional magnetic sample plate applications are not capable of achieving robust mixing. For example, the magnetic particles generally tend to aggregate and cluster in discrete areas of the sample wells. In addition, the plate itself must be moved between steps of the analysis, which requires significant automation.

Accordingly, a need exists to improve the overall speed and efficiency of sample mixing and separation using magnetic particles, including ultra-fast homogenous mixing of sample fluids and the accessible, parallel processing of a large number of sample fluids.

A need also exists to improve the overall speed and efficiency of sample mixing and separation using magnetic particles of a broad volume range, for example including larger volume samples.

SUMMARY

Apparatus, systems, and methods in accordance with various aspects of the applicant's present teachings allow for the processing of sampling devices and fluids using electromagnetic assemblies without the limitations on sample volume, sample loss, and magnetic particle loss experienced with known systems. In various aspects, increasing mass transfer of substances from one medium to another medium (eg. solid or liquid) can also be enhanced. By way of example, fluids can be processed within a fluid container, such as an open fluid container (e.g., open to the ambient atmosphere, without a top cover), using magnetic particles disposed within the fluids. By way of another example, the fluid container may comprise a chamber having continuous fluid flow. The magnetic particles can be configured to be agitated by a magnetic field generated by a magnetic structure and/or assembly arranged adjacent to the fluid container, for example, arranged about the periphery of the fluid container. The magnetic structure can be arranged in a two-dimensional array about the periphery of the fluid container. The magnetic assembly can also include a plurality of vertically-spaced magnetic structures arranged in a horizontal or substantially horizontal layer. In some embodiments, the vertical position of one or more of the magnetic structures can be adjustable, for instance, to process different sample volumes. Each of the magnetic structures can be formed by one or more magnets, such as an electromagnet, disposed in a horizontal plane about the fluid container. Based on the selective application of signals to the various electromagnets of the one or more magnetic structures at the one or more vertical positions of the electromagnetic assembly, the magnetic particles can be influenced to rotate, spin, move horizontally (laterally) side-to-side, and/or vertically up-and-down by the combined effect of the magnetic field gradients generated by the various electromagnets within the fluid so as to rapidly and efficiently mix the fluid and/or capture target analytes within the fluid, by way of non-limiting example. As noted above, the magnetic structures can be formed from a plurality of electromagnets disposed around the fluid container, with each electromagnet being individually controlled to generate a desired magnetic field within the fluid container effective to influence the magnetic particles disposed therein. By way of example, the signals applied to the electromagnets of each magnetic structure (e.g., in a single horizontal layer) can generate magnetic field gradients substantially in the x-y plane, while the signals applied to the electromagnets of the different magnetic structures (e.g., the electromagnets in different horizontal layers) can result in magnetic field gradients exhibiting a z-direction or vertical component.

In accordance with various aspects of the present teachings, the system may operate to achieve a broad range of volume sample preparation, including larger volumes, including those up to 10 mL. This can include vertical mixing techniques in certain embodiments. In accordance with various aspects of the present teachings, the system may operate without the integrated microfluidic delivery of the sample to the mixing chamber within the container such that the methods and systems disclosed herein can enable the processing of a variety of different volumes of samples therewithin. Whereas micro-fluidic based systems generally are closed systems that rely on diffusion, capillary forces, or microfluidic pumps to transport a fixed quantity of liquid through fully-filled microfluidic networks, systems and methods in accordance with various aspects of the present teachings can utilize containers that can be filled or partially-filled with various volumes of the fluid sample, thereby allowing for the reduction or expansion of the sample volume to be processed, depending for example on the availability or expense of the sample and/or on the requirements of a particular assay. In some aspects, samples to be processed (and the reagents utilized to process the same) can be directly added to the open fluid container (e.g., via an auto-sampler or pipette inserted through the open end of the container) and can likewise be directly removed therefrom (e.g., via a capture device) following the processing, for example. In accordance with various aspects of the applicant's teachings, the methods and systems disclosed herein can process a variety of different volumes of samples.

In accordance with various aspects of the applicant's teachings, a fluid processing system is provided that can include at least one fluid container defining a fluid chamber therein for containing a fluid and a plurality of magnetic particles; at least one magnetic assembly comprising one or more magnetic structures disposed around the at least one fluid container at one or a plurality of vertical positions (e.g., arranged in horizontal layers), each of the one or plurality of magnetic structures comprising a plurality of electromagnets configured to generate a magnetic field within the at least one fluid container; and a control component coupled to the one or plurality of magnetic structures and configured to control the magnetic field generated by each of the plurality of electromagnets to generate a plurality of magnetic field gradients within the at least one fluid container sufficient to magnetically influence the plurality of magnetic particles within the fluid.

In some aspects, the fluid chamber extends from a lower, closed end to an upper, open end that is configured to be open to the atmosphere to receive the fluid to be processed therethrough.

In some aspects, the magnetic assembly is configured to magnetically influence the plurality of magnetic particles in a horizontal x-y direction and/or a vertical z-direction. Based on the selective application of electrical signals to the plurality of electromagnets surrounding the fluid container at the one or more various vertical positions, the magnetic particles can be influenced to rotate, spin, move horizontally side-to-side, and/or vertically up-and-down within the fluid sample by the combined effect of the magnetic field gradients generated by the various electromagnets. For example, the signals applied to the electromagnets of each magnetic structure can be configured to generate magnetic field gradients substantially in the x-y plane, while the signals applied to the electromagnets of the different magnetic structures, if present (e.g., the electromagnets in different horizontal layers) can result in magnetic field gradients exhibiting a z-direction or vertical component. By way of non-limiting example, when more than one magnetic structure is present, the plurality of magnetic structures can be disposed substantially in horizontal layers corresponding to the plurality of vertical positions, wherein each magnetic structure can be configured to magnetically influence the plurality of magnetic particles in an x-y direction substantially within its corresponding horizontal layer when activated by the control component independent of the other of said plurality of magnetic structures. In some aspects, the fluid processing system may further include a positioning element configured to adjust a vertical position of at least one of the plurality of electromagnets relative to the fluid container. In some embodiments, the positioning element is configured to adjust the position based on a volume of the at least one fluid in the fluid chamber. Additionally or alternatively, in some aspects the magnetic assembly can comprise at least three magnetic structures that are configured to be selectively activated based on at least one of the volume of the fluid in the fluid chamber and to maintain the magnetic particles at a desired fluid level within the volume.

In some aspects, the system is configured to process the at least one fluid by mixing it. In some aspects, the system is configured to process the at least one fluid by performing fluid separation to capture at least one target analyte within the at least one fluid. The plurality of electromagnets in each of the magnetic structures can vary in number, but in some aspects the magnetic structures can comprise four electromagnets surrounding the periphery of the fluid chamber in each horizontal layer.

The fluid container(s) can have a variety of configurations. For example, in some aspects, the fluid chamber can be configured to extend from a lower, closed end to an upper, open end that is configured to be open to the atmosphere to receive the fluid to be processed therethrough. In some aspects, the at least one fluid container can be configured as a macro-scale fluid container that is configured to operate when partially-filled. The fluid chamber can exhibit a variety of maximum volumes such as in a range of about 1 mL to about 10 mL, by way of non-limiting example. Additionally or alternatively, in various aspects, the at least one fluid container can comprise a plurality of fluidically-isolated fluid containers, wherein at least a portion of the plurality of electromagnets are configured to generate the magnetic field within two or more of the plurality of fluid containers. For example, the at least one fluid container can comprise a plurality of sample wells arranged within a sample plate and the electromagnets of the at least one magnetic assembly can be configured to simultaneously influence the magnetic particles arranged within a plurality of the sample wells.

Additionally or alternatively, in some aspects, the fluid processing system can be configured as a standalone mixing device that can process the fluid contained in a single vial or one or more vials simultaneously. In various aspects, the fluid processing system can include a plurality of sample wells arranged within a sample plate that can be integrated with or removably associated with the magnetic assembly so as to simultaneously influence magnetic particles arranged within each of the plurality of sample wells. In some embodiments, the sample plate is formed as an open-well sample plate having one or more fluidically-isolated sample chambers. For example, in some embodiments, the open-well sample plate comprises a 96 well sample plate modified in accordance with the present teachings. In some embodiments, the open-well sample plate may include more than 96 sample wells. In some embodiments, the open-well sample plate may include less than 96 sample wells, such as 1, 4, 8, 12, 32, and 64 sample wells. In some embodiments, the open well sample plate may comprise a single vial. In some aspects, the sample plate comprises a bottom surface configured to removably engage at least a portion of the electromagnetic structures (e.g., the sample plate can be removed from the electromagnetic assembly).

In accordance with various aspects of the applicant's present teachings, the control component can be configured to control the magnetic field generated by each of the plurality of electromagnets by applying at least one radio frequency (RF) waveform to each of the plurality of electromagnets in the electromagnetic assembly. In some aspects, the at least one RF waveform applied to each of the plurality of electromagnets can exhibit a phase delay relative to the signals of the other plurality of electromagnets. For example, the phase delay can be a 30° phase delay, a 60° phase delay, a 90° phase delay, a 120° phase delay, a 150° phase delay, a 180° phase delay, a 210° phase delay, a 240° phase delay, a 270° phase delay, a 300° phase delay, a 330° phase delay, a 360° phase delay, and any value or range between any two of these values (including endpoints). In one aspect, for example, the control signal applied to the four electromagnets in each magnetic structure (e.g., in each horizontal layer) can comprise an RF waveform exhibiting a ±90° shift relative to the adjacent electromagnets in that layer and/or the control signal applied to the four electromagnets in a magnetic structure can comprise an RF waveform exhibiting a ±90° shift relative to its vertically-adjacent electromagnet in another magnetic structure (e.g., of a different horizontal layer). In various related aspects, the fluid processing system can include at least one memory operatively coupled to the controller configured, for example, to store at least one sample processing protocol for execution by the controller.

In accordance with various aspects of the applicant's present teachings, the fluid processing system can be utilized to prepare a sample for or to interface with any number of downstream analysis instruments, including a liquid chromatography (LC) column, chemical electrophoresis (CE) system, a differential mobility spectrometer (DMS), or a mass spectrometer (MS) system (e.g., an ion source of a mass spectrometer), all by way of non-limiting example, that can be configured to receive the fluid from the fluid processing system. Moreover, in various aspects, the fluid may be analyzed using a mass spectrometer (MS). In accordance with various aspects of the applicant's present teachings, fluid processed by the fluid processing system can be transferred to a MS, DMS-MS, LC-MS, LC-DMS-MS via various fluid handling techniques, including, without limitation, autosamplers, acoustic droplet dispensers, or the like.

In accordance with various aspects of the applicant's present teachings, a method for processing fluids is provided that comprises delivering a fluid sample and a plurality of magnetic particles to a fluid chamber of at least one fluid container having an electromagnetic assembly disposed around the periphery of the fluid container, the magnetic assembly comprising one or a plurality of magnetic structures disposed around the at least one fluid container at one or a plurality of vertical positions (e.g., arranged in horizontal layers), each of the one or plurality of magnetic structures comprising a plurality of electromagnets; providing an electrical signal to each of the plurality of electromagnets so as to generate a magnetic field within the at least one fluid container, wherein the magnetic field is configured to influence the plurality of magnetic particles; adjusting the electrical signal to modify the magnetic field within the fluid sample; and thereafter withdrawing the sample fluid from the fluid container.

In some aspects, the fluid chamber can extend along a vertical axis from a lower, closed end to an upper, open end that is configured to be open to the atmosphere to receive the fluid to be processed therethrough, wherein the one or more plurality of magnetic structures are disposed in one or more horizontal layers corresponding to the one or a plurality of vertical positions, and wherein each magnetic structure is configured to magnetically influence the plurality of magnetic particles in an x-y direction within its corresponding horizontal layer when an electrical signal is provided to the electromagnets of each magnetic structure independent of the other of said plurality of magnetic structures, if present. For example, the signals applied to the electromagnets of each magnetic structure can be configured to generate magnetic field gradients substantially in the x-y plane, while the signals applied to the electromagnets of the different magnetic structures, if present (e.g., the electromagnets in different horizontal layers) can result in magnetic field gradients exhibiting a z-direction or vertical component. Thus, in some aspects, the selective application of electrical signals to the plurality of electromagnets surrounding the fluid container at the various vertical positions can cause the magnetic particles to be influenced to rotate, spin, move horizontally side-to-side, and/or vertically up-and-down within the fluid sample by the combined effect of the magnetic field gradients generated by the various electromagnets. In various aspects, adjusting the electrical signal to modify the magnetic field within the fluid sample can comprise performing a multi-step sample processing protocol. By way of example, one or more reagents can be added to the at least one sample container after a first step of the sample processing protocol. In various aspects, delivering the fluid sample to the fluid chamber of the at least one fluid container comprises delivering the fluid sample directly thereto using any of autosampler and pipette.

In some aspects the method can comprise adjusting a vertical position of at least one of the plurality of electromagnets relative to the fluid container based on the volume of the fluid in the fluid chamber or to maintain the magnetic particles at a desired fluid level within the volume. Additionally or alternatively, in some aspects the magnetic assembly can comprise at least three magnetic structures, the method further comprising selectively activating the at least three magnetic structures based on at least one of the volume of the fluid in the fluid chamber and to maintain the magnetic particles at a desired fluid level within the volume. For example, in some aspects, adjusting the electrical signal to modify the magnetic field within the fluid sample can comprise performing a multi-step sample processing protocol that can also include adjusting the vertical position of some of the electromagnets and/or selectively activating the electrodes of the various magnetic structures.

In various exemplary aspects, one of the plurality of magnetic structures can comprise four electromagnets, wherein the at least one radio frequency waveform applied to each of the plurality of electromagnets according to:

$$I_{first\ electromagnet} = I_0 \sin(ft),$$

$$I_{second\ electromagnet} = I_0 \sin(ft+\pi/2),$$

$$I_{third\ electromagnet} = I_0 \sin(ft+\pi),\ \text{and}$$

$$I_{fourth\ electromagnet} = I_0 \sin(ft+3\pi/2),$$

wherein I is electrical current, f is frequency, and t is time.

In some aspects, a fluid processing system comprises at least one fluid container defining a fluid chamber therein for containing a fluid and a plurality of magnetic particles; at least one magnetic assembly comprising a plurality of magnetic structures disposed around the at least one fluid container at a plurality of vertical positions, each of the plurality of magnetic structures comprising a plurality of electromagnets configured to generate a magnetic field within the at least one fluid container; and a control component coupled to the plurality of magnetic structures, the control component being configured to control the magnetic field generated by each of the plurality of electromagnets to generate a plurality of magnetic field gradients within the at least one fluid container sufficient to magnetically influence the plurality of magnetic particles within the fluid, wherein the fluid container comprises an open port probe, the open port probe comprising a tubular member, an inlet for the inflow of a solvent and an outlet for the outflow of the solvent and a tip end open to the atmosphere and configured such that the inflow and outflow of the solvent are directed to the tip end to maintain a steady state level of solvent.

In some aspects, a substrate surface containing an embedded analyte is contacted with the solvent at the tip end of the open port probe to cause desorption of the analyte from the substrate surface to the solvent. In various aspects, the substrate surface may be a solid phase microextraction fibre.

In some aspects, a fluid processing system comprises at least one fluid container defining a fluid chamber therein for containing a fluid and a plurality of magnetic particles; at least one magnetic assembly comprising a plurality of magnetic structures disposed around the at least one fluid container at a plurality of vertical positions, each of the plurality of magnetic structures comprising a plurality of electromagnets configured to generate a magnetic field within the at least one fluid container; and a control component coupled to the plurality of magnetic structures, the control component being configured to control the magnetic field generated by each of the plurality of electromagnets to generate a plurality of magnetic field gradients within the at least one fluid container sufficient to magnetically influence the plurality of magnetic particles within the fluid, wherein the fluid container comprises an open port probe, the open port probe comprising a tubular member, an inlet and an outlet for a solvent, a tip end open to the atmosphere and configured such that steady state level of solvent is maintained.

In some aspects, a method of processing a substrate surface with an embedded analyte comprises: delivering a fluid sample and a plurality of magnetic particles to a fluid chamber of at least one fluid container having an electromagnetic assembly disposed around the periphery of the fluid container, the electromagnetic assembly comprising one or a plurality of magnetic structures disposed around the at least one fluid container at one or a plurality of vertical positions, each of the one or plurality of magnetic structures comprising a plurality of electromagnets; providing an electrical signal to each of the plurality of electromagnets so as to generate a magnetic field within the at least one fluid container, wherein the magnetic field is configured to influence the plurality of magnetic particles; adjusting the electrical signal to modify the magnetic field within the fluid sample; contacting the substrate surface having an embedded analyte to the fluid sample to cause transfer of at least a portion of the analyte from the substrate surface to the fluid sample; thereafter withdrawing the fluid sample from the fluid container.

In some aspects, a method of processing a fluid sample comprising: delivering a fluid sample containing an analyte and a plurality of magnetic particles to a fluid chamber of at least one fluid container having an electromagnetic assembly disposed around the periphery of the fluid container, the electromagnetic assembly comprising one or a plurality of magnetic structures disposed around the at least one fluid container at one or a plurality of vertical positions, each of the one or plurality of magnetic structures comprising a plurality of electromagnets; providing an electrical signal to each of the plurality of electromagnets so as to generate a magnetic field within the at least one fluid container, wherein the magnetic field is configured to influence the plurality of magnetic particles; adjusting the electrical signal to modify the magnetic field within the fluid sample; contacting a substrate surface with an affinity for the analyte to the fluid sample to cause transfer of at least a portion of the analyte from the fluid sample to the substrate surface.

These and other features of the applicant's teaching are set forth herein.

BRIEF DESCRIPTION OF THE DRAWINGS

A detailed description of various embodiments is provided herein below with reference, by way of example, to the following drawings. It will be understood that the drawings are exemplary only and that all reference to the drawings is made for the purpose of illustration only, and is not intended to limit the scope of the embodiments described herein below in any way. For convenience, reference numerals may also be repeated (with or without an offset) throughout the figures to indicate analogous components or features.

FIGS. 8A-8D depict another illustrative fluid processing system according to various aspects of the applicant's teachings.

FIGS. 9A and 9B depict another illustrative fluid processing system according to various aspects of the applicant's teachings.

FIGS. 15A-15D an exemplary processing protocol using the fluid processing system of FIG. 12.

FIGS. 16A-16C depict another exemplary fluid processing system and an exemplary processing protocol according to various aspects of the applicant's teachings.

FIGS. 17A-17C depict another exemplary processing protocol for the fluid processing system of FIGS. 16A-16C according to various aspects of the applicant's teachings.

DETAILED DESCRIPTION

Figure 1A:
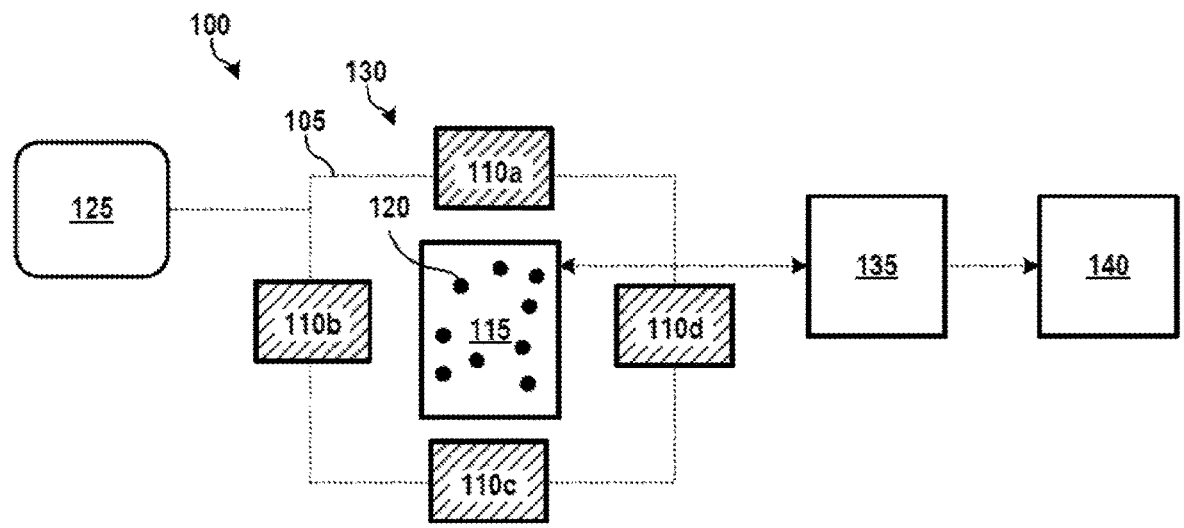
FIGS. 1A-1D depict an illustrative fluid processing system according to various aspects of the applicant's teachings.

Those skilled in the art will understand that the methods, systems, and apparatus described herein are non-limiting exemplary embodiments and that the scope of the applicant's disclosure is defined solely by the claims. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art. The features illustrated or described in connection with one exemplary embodiment may be combined with the features of other embodiments. Such modifications and variations are intended to be included within the scope of the applicant's disclosure.

The present teachings generally relate to fluid processing methods and systems for mixing, separating, filtering, or otherwise processing a fluid sample by utilizing magnetic particles dispersed therein. In accordance with various aspects of the present teachings, the fluid sample may be disposed within a sample or fluid container. In some embodiments, the fluid container may be an open fluid container (e.g., open to the atmosphere) such that the sample and/or reagents can be directly added to the open fluid container (e.g., via an auto-sampler or pipette inserted through the open end of the fluid container) and can likewise be directly removed therefrom (e.g., via a capture device) following the processing, for example. The magnetic particles, disposed within the fluid, can be configured to be agitated under the effect of magnetic fields (or gradients) generated by a magnetic assembly arranged adjacent to the fluid containers (e.g., arranged about the periphery of the fluid container) so as to facilitate the movement of the magnetic particles within the fluid. The magnetic assembly may include a one or a plurality of magnetic structures arranged in horizontal or substantially horizontal layers. Each of the magnetic structures may be formed by one or more magnets, such as an electromagnet. In some embodiments, the vertical position of one or more of the magnetic structures may be adjustable, for instance, to process different sample volumes and/or to affect a characteristic of a magnetic field generated by the magnetic assembly. Additionally or alternatively, in some embodiments, the electrodes of the various magnetic structures (e.g., of the different vertically-spaced layers) can be selectively energized so as to process different sample volumes and/or to affect a characteristic of a magnetic field generated by the magnetic assembly.

The magnetic assembly structures can be formed from a plurality of electromagnets disposed around the fluid container at one or more different vertical heights, with each electromagnet being individually controlled to generate a desired magnetic field within the fluid container effective to influence the magnetic particles disposed therein. Based on the selective application of electrical signals to the plurality of electromagnets surrounding the fluid container, the magnetic particles can be influenced to rotate, spin, move horizontally side-to-side, and/or vertically up-and-down within the fluid sample by the combined effect of the magnetic field gradients generated by the various electromagnets. By way of example, the signals applied to the electromagnets of each magnetic structure (e.g., in a single horizontal layer) can be configured to generate magnetic field gradients substantially in the x-y plane, while the signals applied to the electromagnets of the different magnetic structures, if present (e.g., the electromagnets in different horizontal layers) can result in magnetic field gradients exhibiting a z-direction or vertical component. In this manner, the combined effect of the plurality of electromagnets can produce a magnetic field within a sample container with different characteristics, such as different strengths and/or directionality so as to rapidly and efficiently mix the fluid and/or capture target analytes within the fluid, by way of non-limiting example.

In various aspects, the controller may be configured to differentially actuate the electromagnets via the application of one or more radio frequency (RF) signals, direct current (DC) signals, alternating current (AC) signals, or the like. In various aspects, the RF signals applied to the plurality of electromagnets can exhibit different phase delays relative to one another so as to effect the desired movement of the electromagnets within the sample fluid. In some aspects, the DC signals can be effective to isolate the electromagnets (e.g., draw magnetic particles to one side and/or vertical level of the fluid container) such that fluid can be withdrawn from the container without aspiration of the magnetic particles, by way of non-limiting example.

Fluid processing systems described according to various aspects may be configured to process fluids at the micro-scale or macro-scale (including large-volume formats). In general, the macro-scale involves fluid volumes in the milliliter range, while micro-scale fluid processing involves fluid volumes below the milliliter range, such as microliters, picoliters, or nanoliters. Large-volume formats can involve the processing of fluid volumes greater than 1 mL. For example, fluid processing systems in accordance with various aspects of the present teaching can be capable of processing a fluid volume of about 50 µL to about 1 mL and even greater, including for example, about 1.5 mL, about 2 mL, about 5 mL, about 10 mL, or greater. However, it will be appreciated in light of the present teachings that the fluid processing systems may process any fluid volume capable of operating as described herein.

The use of magnetic assemblies to influence magnetic particles according to various aspects of the present teachings, for instance, as compared to conventional magnetic particle processing systems, can provide multiple technological advantages. One non-limiting example of such an advantage includes significantly improved rates of diffusion for increased sample contact rate in various volumes of the sample fluid, for example, to improve analyte capture efficiency in a magnetic immunoassay. Another non-limiting example of a technological advantage includes increased sample mixing efficiency as the magnetic structures of a magnetic assembly can influence the magnetic particles to provide for faster and more effective sample mixing due to, for example, more robust magnetic particle movement and movement in multiple dimensions. This can, for example, lead to increased mass transfer between components.

Processing samples using the fluid processing structures configured according to applicant's teachings generates fast reaction kinetics. For instance, protein processing (including immunological affinity pull-down, washing, elution/denaturation, reduction, alkylation, and digestion steps) can be completed in about 10-12 minutes, compared with a one- or two-day processing time for manual, in-tube processing. The increased processing speed may be achieved, for example, due to overcoming diffusion as a rate-limiting step of fluid processing (e.g., a rate-limiting step of LC) and the necessity of utilizing small, fixed volumes in known microfluidic platforms. In addition, such fast, efficient sample processing may be achieved across a large array of sample reaction containers simultaneously as the fluid processing structures configured according to applicant's teachings may be integrated into large arrays of sample reaction wells, thereby increasing sample processing and enabling automation via an autosampler, for example. It will be appreciated in light of the present teachings that the fluid processing systems described herein provide multiple other technological advantages in addition to the aforementioned non-limiting examples.

While the systems, devices, and methods described herein can be used in conjunction with many different fluid processing systems, an exemplary fluid processing system 100 is illustrated schematically in FIG. 1A. It should be understood that the fluid processing system 100 represents only one possible fluid processing system for use in accordance with embodiments of the systems, devices, and methods described herein, and fluid processing systems and/or components thereof having other configurations and operational characteristics can all be used in accordance with the systems, devices, and methods described herein as well.

Figure 1B:
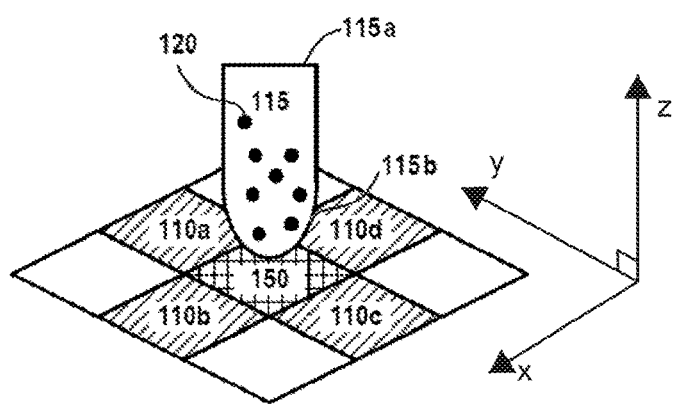

FIG. 1A schematically depicts a fluid processing system 100 according to various aspects of some embodiments of the present teachings. As shown in FIG. 1A, the exemplary fluid processing system 100 includes a fluid processing structure 130 having a fluid container 115 and a magnetic structure 105 configured to generate a magnetic field gradient or magnetic force within the fluid container, as discussed in detail below. The fluid container 115 can generally comprise any type of container configured to hold a sample fluid, such as a sample well, a vial, a fluid reservoir, or the like, defining a fluid-containing chamber therein. As best shown in FIG. 1B, the exemplary fluid container 115 extends from an open, upper end 115a (open to the ambient atmosphere) to a lower, closed end 115b such that the fluid within the fluid container 115 can be loaded and/or removed therefrom by one or more liquid loading/collection devices 135 that can be inserted into the open, upper end 115a. It will be appreciated by those skilled in the art that the container 115 can include a removable cap that can be coupled to the open, upper end 115a (e.g., an Eppendorf tube) during various processing steps, for example, to prevent the escape of fluid during mixing, contamination, and/or evaporation. Illustrative liquid loading/collection devices 135 may include, without limitation, manual sample loading devices (e.g., pipette), multi-channel pipette devices, acoustic liquid handling devices, and/or an auto-sampler, all by way of non-limiting example.

With reference again to FIG. 1A, the sample fluid can have a plurality of magnetic particles 120 disposed therein and that can be added to the sample fluid prior to transferring the sample fluid to the fluid container 115, or can be added to the fluid container 115 before or after the sample fluid has been transferred thereto. The magnetic particles 120 or portions thereof may be formed from various magnetically susceptible materials, including, without limitation ferromagnetic materials, such as various iron oxide materials (e.g., $Fe_2O_3$, $SiO_2$ coated $Fe_2O_3$, $Fe_3O_4$, or the like). In some embodiments, the magnetic particles 120 may include a magnetic "core" coated with a non-magnetic coating, for example, configured to not react with the fluids and/or to selectively bind a material (e.g., a biomaterial) of interest. In some embodiments, at least a portion of the magnetic particles 120 may include paramagnetic beads. In an embodiment using paramagnetic beads, at least a portion of the magnetic particles 120 may include ferromagnetic magnetic particles to agitate all of the magnetic particles in the fluid and/or to facilitate movement of the magnetic particles within the system. In some embodiments, the magnetic particles may include beads modified with various alkyl groups, such as C18 alkyl groups ("C18 beads"). By way of non-limiting example, such C18 beads may be used for the purification, desalting and concentration of peptides and protein digests, which is a major function of LC. It will also be appreciated by a person skilled in the art in light of the present teachings that in some embodiments, the magnetic particles can comprise beads that have been functionalized, for example, by being coated with antibodies ("affinity beads") to provide for selective binding of particular analytes within the sample. The magnetic particles 120 may have various shapes, such as spherical and/or rod-shaped (i.e., magnetic stir bars), such as described in International Patent Application Publication No. WO 2015/128725.

The magnetic structure 105 may include a plurality of electromagnets 110a-d. Although four electromagnets 110a-d are depicted in FIG. 1A, embodiments are not so limited as any number of electromagnets capable of operating according to various aspects of the applicant's teachings may be used. In some embodiments, the four electromagnets 110a-d may operate the same as or substantially similar to a quadrupole magnet structure. For example, a magnetic structure 105 may include 2 electromagnets, 3 electromagnets, 4 electromagnets 110a-d, 5 electromagnets, 6 electromagnets, 7 electromagnets, 8 electromagnets, 9 electromagnets, 10 electromagnets, or more. The electromagnets 110a-d may include any electromagnet known to those having skill in the art, including, for example, a ferromagnetic-core electromagnet. The electromagnets 110a-d may have various shapes, including square, rectangular, round, elliptical, or any other shape capable of operating according to various aspects of the applicant's teachings.

As shown in FIG. 1A, the exemplary fluid processing system 100 additionally includes a controller 125 operatively coupled to the magnetic structure 105 and configured to control the magnetic fields produced by the electromagnets 110a-d. In various aspects, the controller 125 can be configured to control one or more power sources (not shown) configured to supply an electrical signal to the plurality of electromagnets 110a-d. In some embodiments, the electrical signal can be in the form of radio frequency (RF) waveforms, DC current, AC current, or the like. Although RF waveforms are generally used herein as an example of waveforms that can be applied to the electromagnets 110a-d to promote mixing of the fluid sample, embodiments are not so limited, as any type of electrical current capable of operating according to various aspects of applicant's teachings are contemplated herein. By way of example, a DC signal can additionally or alternatively be applied to one or more the electromagnets so as to draw magnetic particles to one side of the fluid container (and out of the bulk fluid) so as to aid in fluid transfer from the container after the mixing step and/or prevent the aspiration of the magnetic particles, by way of non-limiting example. In various aspects, the controller 125 can be any type of device and/or electrical component capable of actuating an electromagnet. In some embodiments, the controller 125 can operate to regulate the magnetic field produced by each of the electromagnets 110a-d by controlling the electrical current passing through a solenoid of each of the electromagnets. In some embodiments, the controller 125 can include or be coupled to a logic device (not shown) and/or a memory, such as a computing device configured to execute an application configured to provide instructions for controlling the electromagnets 110a-d. In some embodiments, the application can provide instructions based on operator input and/or feedback from the fluid processing system 100. In some embodiments, the application can include and/or the memory may be configured to store one or more sample processing protocols for execution by the controller 125.

In various aspects, each electromagnet 110a-d can be individually addressed and actuated by the controller 125. For example, the controller 125 can supply RF electrical signals of different phases to each of the one or more of the electromagnets 110a-d such that one or more of the electromagnets generate a different magnetic field. In this manner, the magnetic field gradient generated by the magnetic structure 105 within the fluid container 115 can be rapidly and effectively controlled to manipulate the movement of magnetic particles 120 within the sample fluid. In some embodiments, the RF waveforms and the characteristics thereof (e.g., phase shifts) may be applied to the electromagnets 110a-d according to the sample processing protocol. It will be appreciated in light of the present teachings that the magnetic structures 105 can be utilized to manipulate the magnetic particles 120 within the sample fluid in various processes including, without limitation, protein assays, sample derivatization (e.g., steroid derivatization, sample derivatization for gas chromatography, etc.), and/or sample purification and desalting. Following this processing, processed fluid may be delivered to various analytical equipment 140, such as a mass spectrometer (MS) for analysis. In some embodiments, a single layer of electromagnets 110a-d (e.g., arranged at a height above the bottom 115b of the fluid chamber about the periphery of the fluid container) can be actuated to generate a magnetic field within the fluid container 115 that captures and/or suspends the magnetic particles 120 in a particular plane within the fluid container. For example, the magnetic particles 120 can be suspended in a particular plane to move the magnetic particles away from the bottom of the fluid container during a fluid collection process and/or for processing fluids (e.g., reagents) in a plane above material (e.g., cells adhering to the lower surface of the fluid chamber), where contact with the material on the lower surface of the fluid chamber is to be avoided.

Figures 1C, 1D:
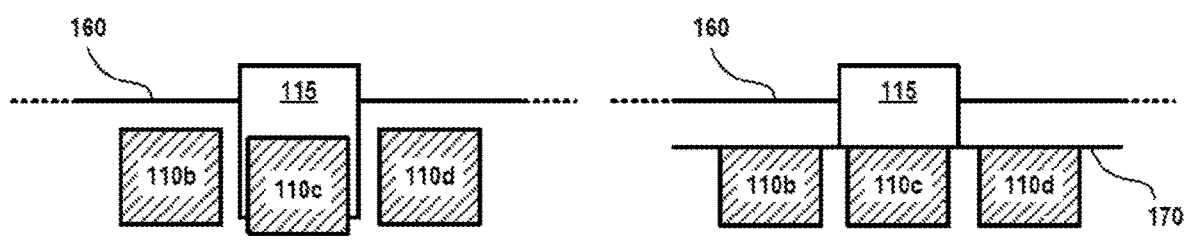

In accordance with various aspects of the present teachings, the magnetic structures 105 may be incorporated into various fluid processing systems and fluid handling devices. With reference now to FIG. 1B, an exemplary magnetic structure 105 according to various aspects of the applicant's teachings is depicted as a standalone mixing device. For instance, a magnetic structure 105 may be used as the mixing element of a magnetic mixer or as a mixing element of a vortex-type mixer (i.e., replacing the motor-driven mixing element). In some embodiments, the fluid container 115 (e.g., a single vial and/or a sample well of a sample plate) can be pressed against an actuator 150 to initiate the controller 125 to actuate the electromagnets 110a-d according to applicant's teachings. In various aspects, magnetic structures 105 can be used for mixing magnetic particles 120 within the sample wells of a sample plate, such as a conventional 4, 8, 12, or 96 well sample plate. In some embodiments, magnetic structures 105 may be configured to mix magnetic particles 120 within the sample wells of an open-well sample plate (i.e., open-to-atmosphere, sealed with a removable covering or cap, and/or partially enclosed). As shown in FIG. 1C, the fluid container 115 (i.e., sample well) of a sample plate 160 may fit down within a cavity formed between the electromagnets 110a-d. In various aspects, as shown in FIG. 1D, a sample plate 160 may be placed on a portion of the fluid processing system 100, such as on a planar surface 170 thereof, such that the sample well 115 may be arranged adjacent to the electromagnets 110a-d.

Figure 2A:
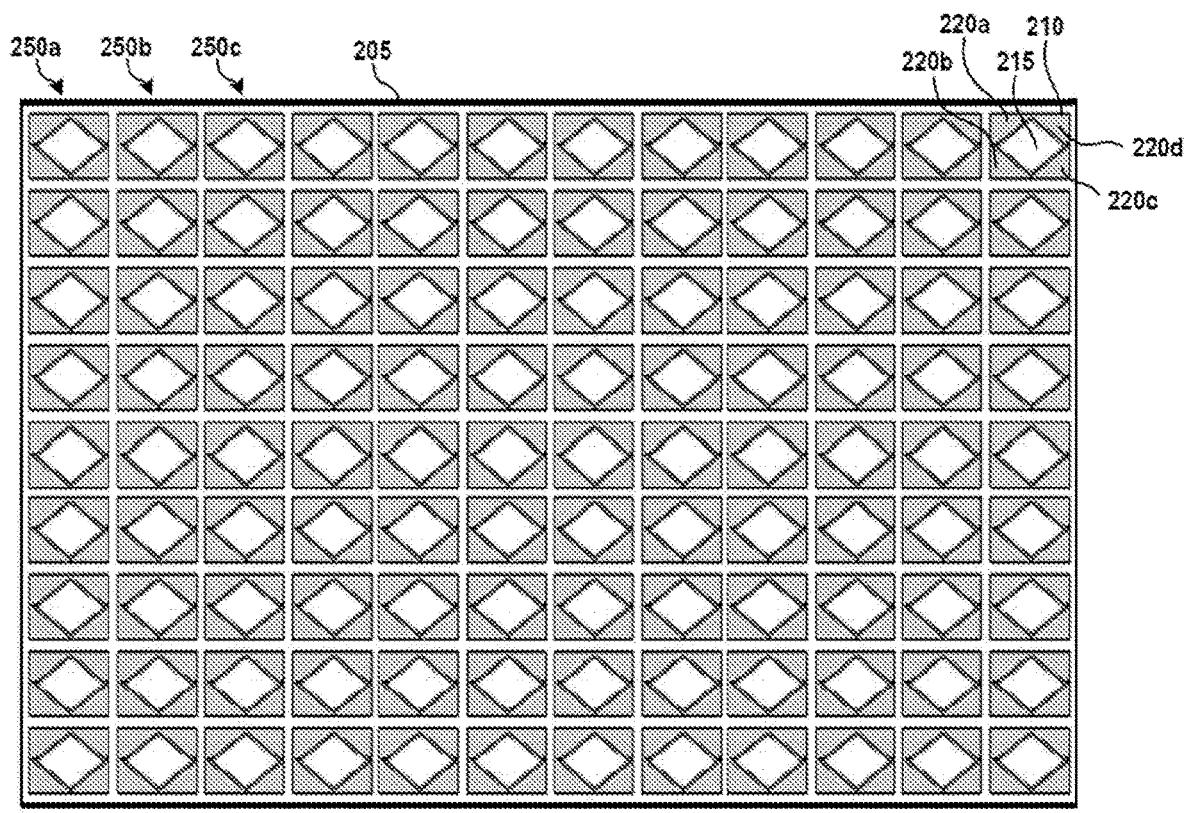
FIGS. 2A and 2B depict an illustrative open-well magnetic sample plate according to various aspects of the applicant's teachings.

FIG. 2A depicts an exemplary open-well magnetic sample plate according to various aspects of the applicant's teachings. As shown in FIG. 2A, a 96-well sample plate 205 may include a plurality of sample wells 215. Although diamond-shaped sample wells 215 are depicted in FIG. 2A, it will be appreciated that the fluid containers in accordance with the present teachings are not so limited. For instance, the sample wells 215 can have various shapes, including square, rectangular, round, elliptical, or any other shape capable of operating according to various aspects of the applicant's teachings. Each sample well 215 may be surrounded about its periphery by a magnetic structure 210 that includes a plurality of electromagnets 220a-d. The magnetic structures 210 and the methods of mixing magnetic particles using RF-driven oscillating magnetic fields according to various aspects of the applicant's teachings may be incorporated into existing sample plate devices, including sample plate devices configured as large, open arrays of sample wells 215. For example, the magnetic structures 210 can be configured to receive standard sample plate devices, such as industry standard 96-sample well arrays 205. This may be achieved, for instance, by using electromagnets 220a-d and magnetic structure 210 formations having a geometry that corresponds with standard sample well plates. In this manner, fluidic channels and pumps are not required, reducing and even eliminating fluid processing issues relating with these elements, including, without limitation, non-specific binding and carryover (i.e., use of disposable sample plate). In addition, the use of open-well sample systems provides for more efficient methods for sample loading and collection, such as integration with an auto-sampler and other automated fluid-handling systems. In this manner, fluid processing systems according to various aspects of the applicant's teachings may allow for the simultaneous processing of large arrays of samples that is simple and efficient from a fluid manipulation and a mechanical complexity perspective.

In an example involving a protein processing assay, pull-down beads can be disposed within the first, leftmost column 250a of sample wells 215, ion-exchange beads can be disposed within the second column 250b of sample wells 215, and trypsin-coated beads can be disposed within a third column 250c of sample wells 215. In this manner, processing of the sample may only require transferring the sample from one column to another column to perform the protein processing assay, while actuating the electromagnet structures 210 surrounding each well appropriately in order to facilitate the processing step performed therein.

Figure 2B:
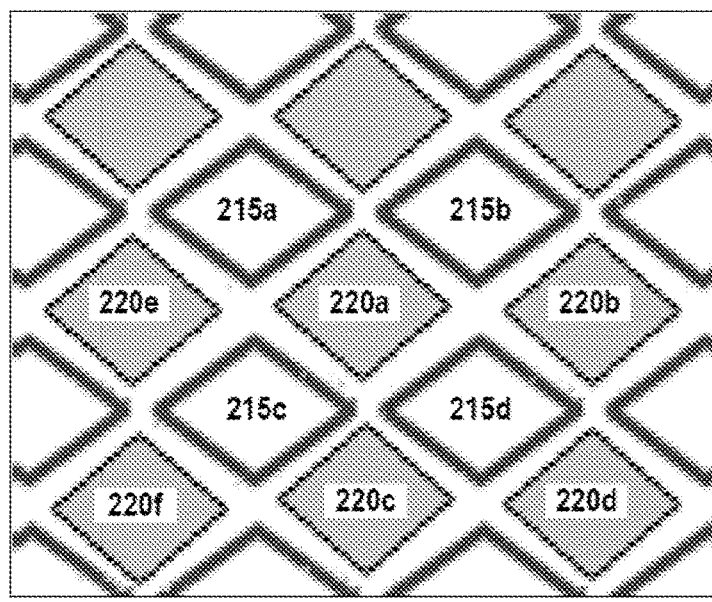

FIG. 2B depicts a layout of a plurality of sample wells 215a-d and associated magnetic structures that comprise electromagnets 220a-f that demonstrates the sharing of electromagnets 220a-f between multiple sample wells 215a-d. In this example, sample well 215d is surrounding by magnetic structure comprising electromagnets 220a, 220b, 220c, and 220d. Electromagnets 220a and 220c also surround sample well 215c that itself is also surrounded by electromagnets 220e and 220f. Electromagnets 220a and 220c can generate a magnetic field that penetrates into both sample wells 215c and 215d. Similarly sample wells 215b and 215d share electromagnets 220a and 220b and sample wells 215a and 215c share electromagnets 220a and 220e. Electromagnet 220a is shared by sample wells 215a-d and can generate a magnetic field in all four sample wells. As should be appreciated, this structure similarly repeats throughout the sample well plate 205 to all sample wells.

Figure 3:
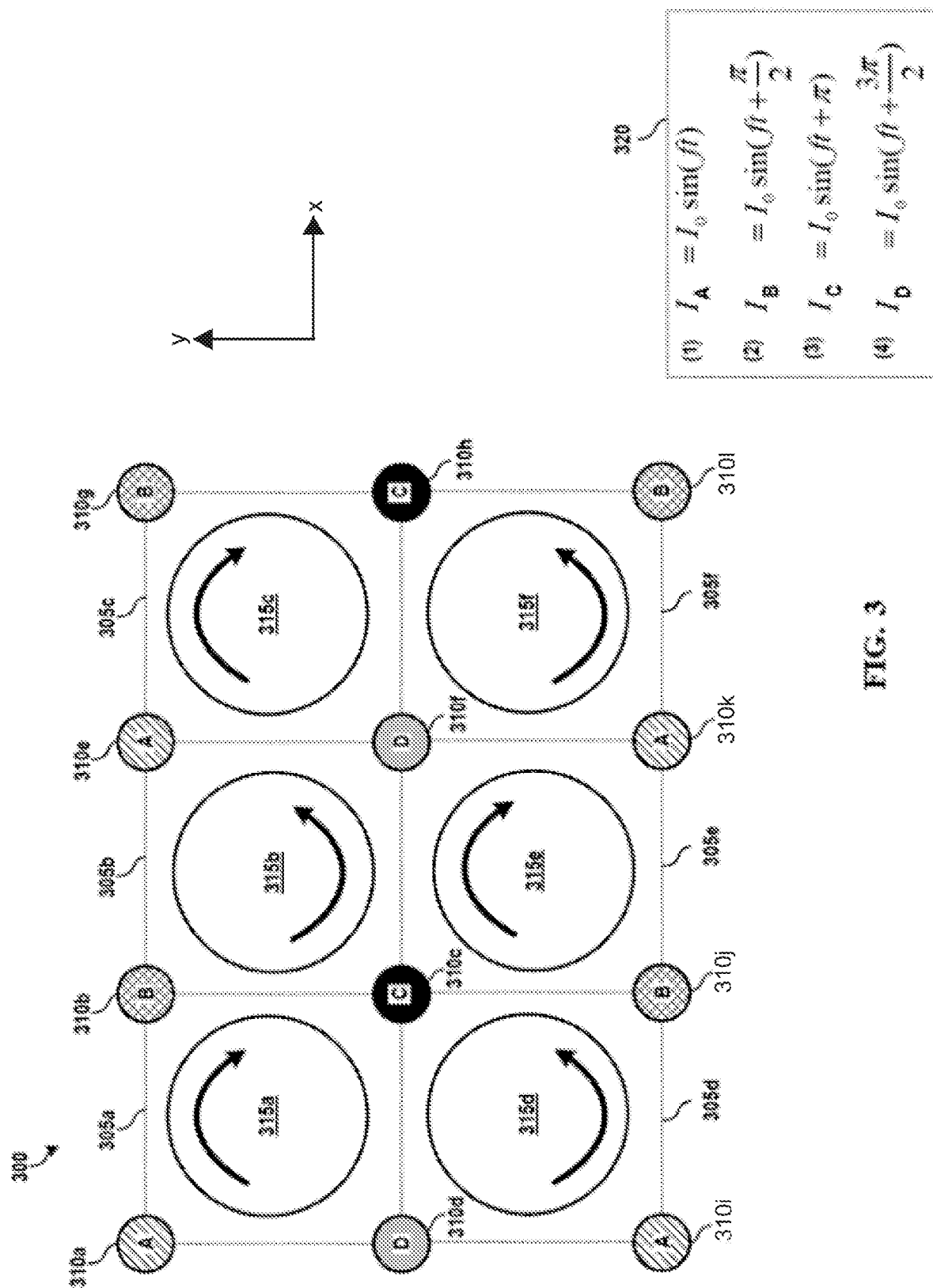
FIG. 3 depicts an illustrative fluid processing system according to various aspects of the applicant's teachings.

FIG. 3 schematically depicts an illustrative fluid processing system according to various aspects of the applicant's teachings. As shown in FIG. 3, the fluid processing system 300 includes a plurality of magnetic structures 305a-f configured to generate a magnetic field gradient within associated fluid containers 315a-f. Each magnetic structure 305a-f can include a plurality of electromagnets 310a-1, with certain of the electromagnets 310a-l being shared among the magnetic structures 305a-f. The electromagnets 310a-l can be controlled via the application thereto of RF signals having different phase delays, such as the following exemplary phase delay equations 320:

$$I_A = I_0 \sin(ft) \quad \text{eq. (1)},$$

$$I_B = I_0 \sin(ft + \pi/2) \quad \text{eq. (2)},$$

$$I_C = I_0 \sin(ft + \pi) \quad \text{eq. (3)},$$

$$I_D = I_0 \sin(ft + 3\pi/2) \quad \text{eq. (4)},$$

wherein I=electrical current, f=frequency, and t=time.

As shown in FIG. 3, the electromagnets 310a-l are labeled A-D according to the phase delay equation 320 corresponding to the electromagnet. The phase delay of the electromagnets 310a-l of the magnetic structures 305a-f produces a 90° phase shift for adjacent electromagnets. However, embodiments are not so limited, as other phase shift values may be used according to various aspects of the applicant's teachings, such as a 180° phase delay, a 270° phase delay, or the like. In various aspects, the actuation of the electromagnets 310a-l according to the phase delay equations 320 causes the magnetic particles (not shown) in sample wells 315a, 315e, and 315c to mix in a clockwise motion and the magnetic particles in sample wells 315b, 315d, and 315f to mix in a counter-clockwise motion. Mixing fluids using magnetic particles agitated according to various aspects of the applicant's teachings causes the magnetic particles to be dispersed homogeneously within each fluid container, providing for optimal exposure and enhanced mixing with the fluid.

Figure 4:
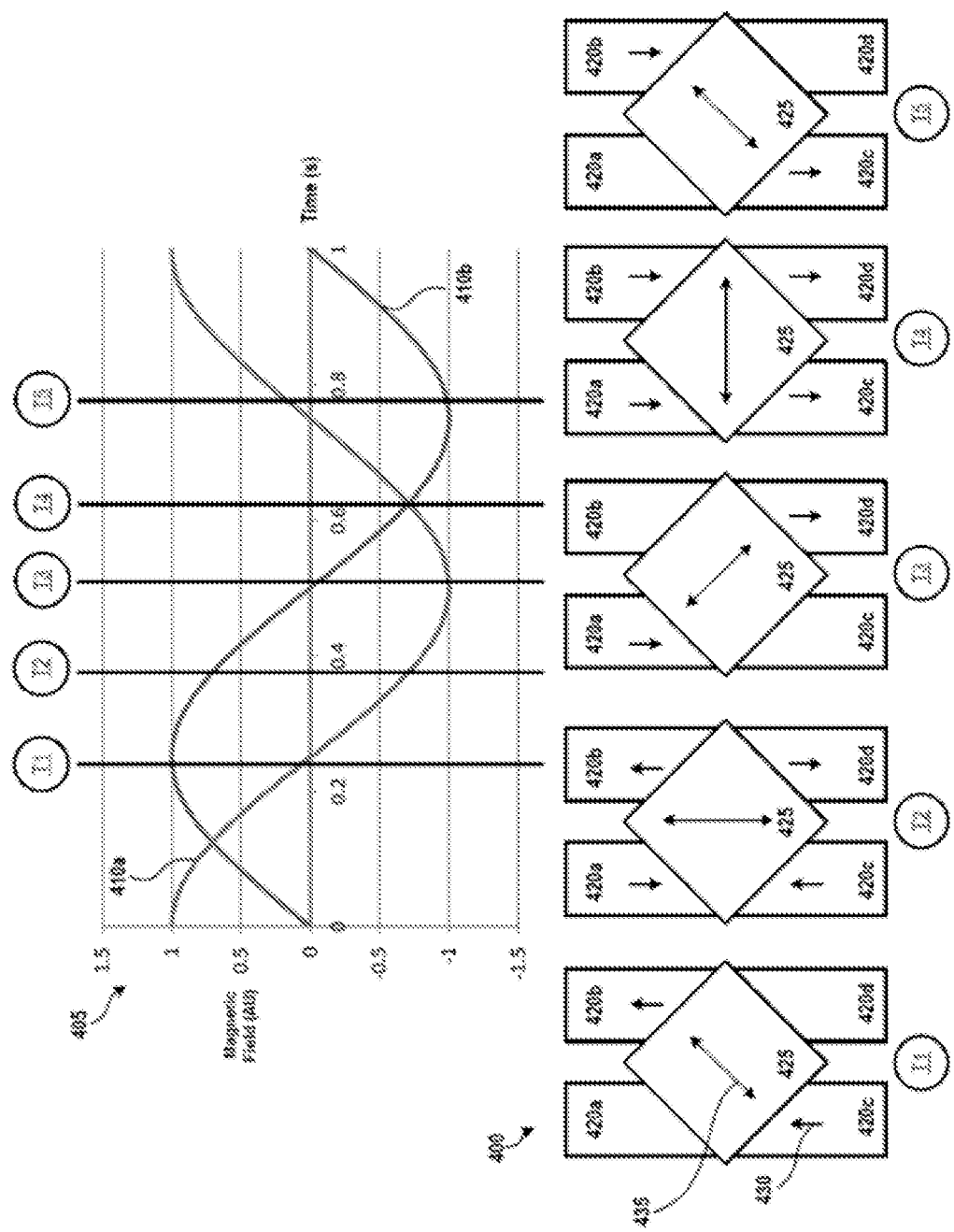
FIG. 4 depicts an illustrative fluid processing structure and mixing pattern thereof according to various aspects of the applicant's teachings.

FIG. 4 depicts an illustrative fluid processing structure and mixing pattern thereof according to various aspects of the applicant's teachings. The graph 405 depicts the magnetic fields 410a, 410b resulting from the application of electric current to the electromagnets 420a-d of a fluid processing structure 400 at time intervals T1-T5 according to various aspects of applicant's teachings. In various aspects, the waveforms of the magnetic fields 410a, 410b represent sine waves which generate the exemplary, schematic movement 425 of the magnetic particles within the container to facilitate continuous magnetic particle mixing and improved mixing efficiency. The magnetic fields 410a, 410b have a 90° phase shift relative to one another, with the magnetic field 410a corresponding to electromagnets 420a and 420d and magnetic field 410b corresponding to electromagnets 420b and 420c. In the illustrative depiction of FIG. 4, it will be appreciated that the electromagnets 420a-d are arranged at different locations relative to the fluid sample such that the orientation of the magnetic field generated by each electromagnet generally differs when the same electrical signal is applied thereto. Likewise, because the electromagnetic pairs (i.e., 420a and 420d, and 420b and 420c) are arranged on opposed sides of the fluid sample, the magnetic field generated by the electrode in each pair is in the same direction 430 when an electrical signal of the same magnitude and of opposite phase are applied to the electromagnet in each pair. Thus, when the exemplary sinusoidal electrical signals of eq. (1)-(4) are applied to electromagnets 420a-d, respectively, the resulting magnetic field in the sample fluid will vary over time as schematically depicted in FIG. 4, with the pair of electromagnets 420a and 420d together generating the magnetic field 410a and the pair of electromagnets 420b and 420c together generating the magnetic field 410b (magnetic field 410b is delayed 90° relative to magnetic field 410a), thereby causing the fluid to experience mixing due to the generally counter-clockwise movement 425 and alignment 435 of the particles at the various time points as schematically depicted It will thus be appreciated in light of the present teachings that different mixing patterns can be effectuated by controlling the RF waveforms applied to the electromagnets of a magnetic structure. For example, with reference to FIG. 5, another illustrative mixing pattern for the fluid processing structure of FIG. 4 is depicted according to various aspects of the applicant's teachings. As shown, the fluid mixing pattern differs from that shown in FIG. 4 in that the controller is configured to apply the following exemplary RF signals of different phase delays to the electromagnets 420a-d, respectively:

$$I_A = I_0 \sin(ft) \quad \text{eq. (5)},$$

$$I_B = I_0 \sin(ft - \pi/2) \quad \text{eq. (6)},$$

$$I_C = I_0 \sin(ft - \pi) \quad \text{eq. (7)},$$

$$I_D = I_0 \sin(ft - 3\pi/2) \quad \text{eq. (8)},$$

wherein I=electrical current, f=frequency, and t=time.

Figure 5:
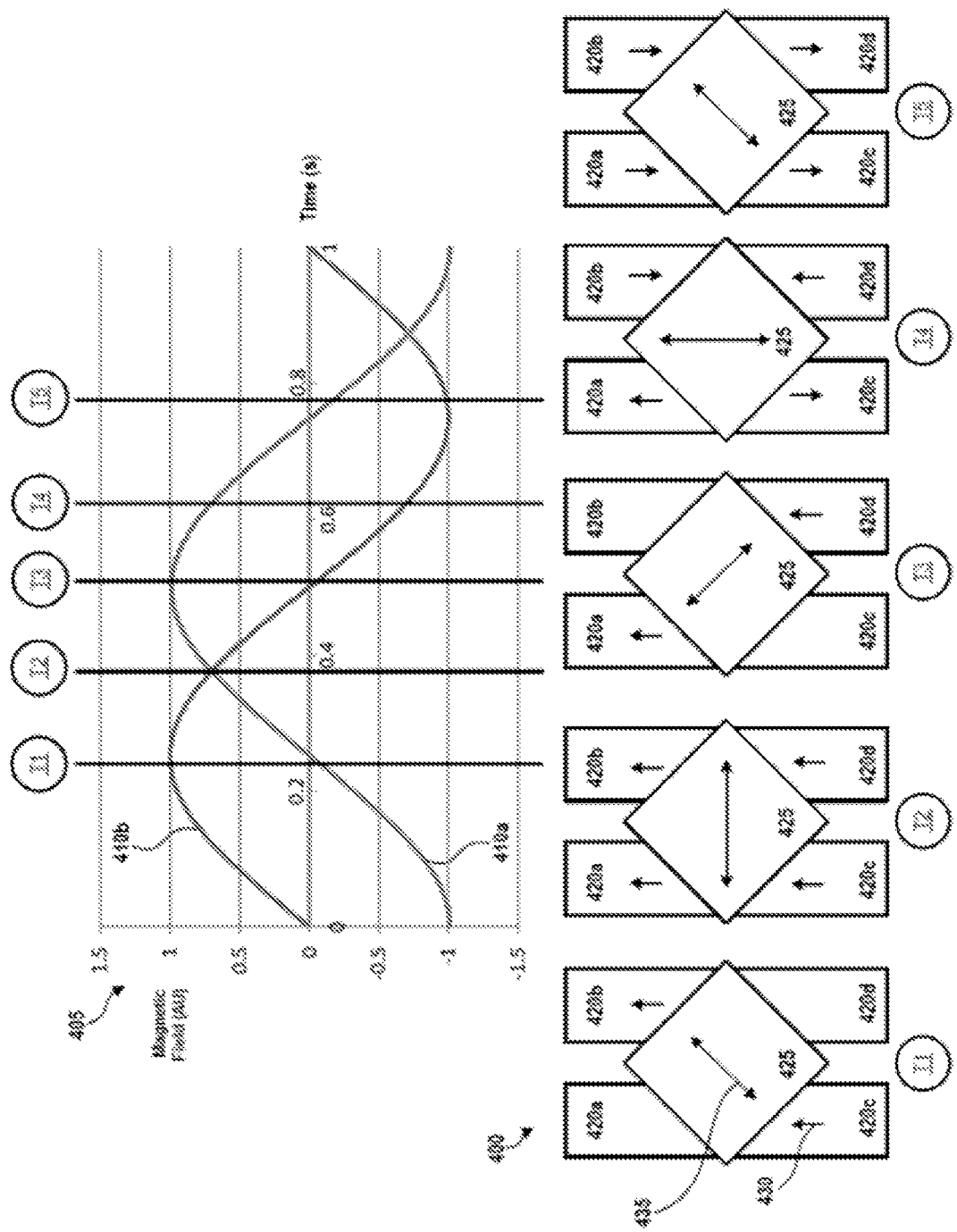
FIG. 5 depicts an illustrative fluid processing structure and mixing patterns thereof according to various aspects of the applicant's teachings.

As shown in FIG. 5, when the exemplary sinusoidal electrical signals of eq. (5)-(8) are applied to electromagnets 420a-d, respectively, the resulting magnetic field in the sample fluid will vary over time as schematically depicted, with the pair of electromagnets 420a and 420d together generating the magnetic field 410a and the pair of electromagnets 420b and 420c together generating the magnetic field 410b. In this case, the magnetic field 410a is instead delayed 90° relative to magnetic field 410b, thereby causing the fluid to be mixed in a general clockwise manner due to the movement 425 of the particles at the various time points as schematically depicted.

Although the sinusoidal RF waveforms applied to each of four electromagnets surrounding the containers of FIGS. 3-5 exhibit a ±90° shift relative to the adjacent electromagnets, the present teachings are not so limited. Indeed, it will be appreciated that any type of waveform may be supplied to electromagnets capable of operating according to applicant's teachings. By way of non-limiting example, the number of electromagnets surrounding each fluid container, the phase shifts between adjacent electromagnets (e.g., a 30°, 60°, 90°, 120°, 150°, 180°, 210°, 240°, 270°, 300°, and 330° phase shifts), and the waveform shape can be varied in accordance with variance aspects of the present teachings. Non-limiting examples of electrical current waveforms may include square, rectangular, triangular, asymmetrical, sawtooth, or any combination thereof. In some embodiments, the type of current supplied to the electromagnets may be modified during operation of a fluid processing system configured according to some embodiments. For instance, at least a portion of the electromagnets may receive an RF waveform with a 90° phase shift, while another portion may receive an RF waveform with a 180° phase shift. In such an embodiment, the phase shift of each portion may be modified during operation of the fluid processing system (e.g., the phase shifts may be switched, synchronized, or the like). In some embodiments, at least a portion of the electromagnets may be operated in parallel, sequence, pulsed, or the like. In various aspects, the current supplied to the electromagnets may be controlled according to a processing protocol. In some embodiments, the processing protocol may be dynamically altered during operation of the fluid processing system based on various factors, such as feedback, operator input, detection of mixing efficiency, analysis results, or the like.

Additionally, as noted above, the electromagnets 420a-d can alternatively have a DC signal applied so as to generate a static magnetic field so as to draw magnetic particles to one side of the fluid container (and out of the bulk fluid) so as aid in fluid transfer from the container after the mixing step and/or prevent the aspiration of the magnetic particles, by way of non-limiting example.

Figure 7B:
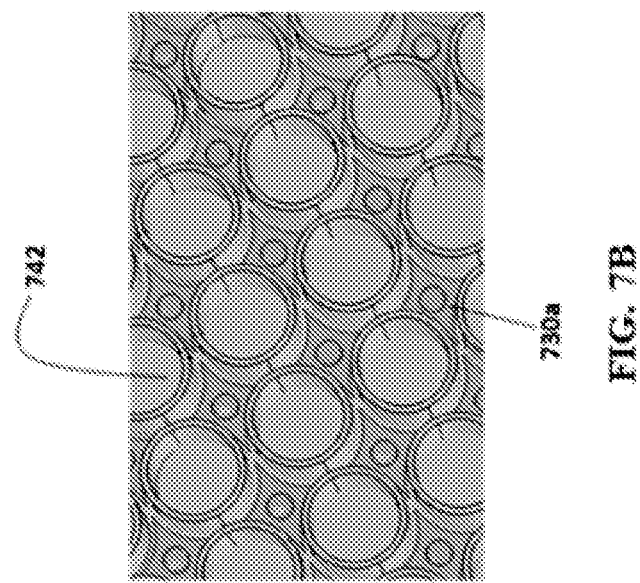
FIGS. 7A-B depict another exemplary fluid processing system according to various aspects of the applicant's teachings.
Figure 7A:
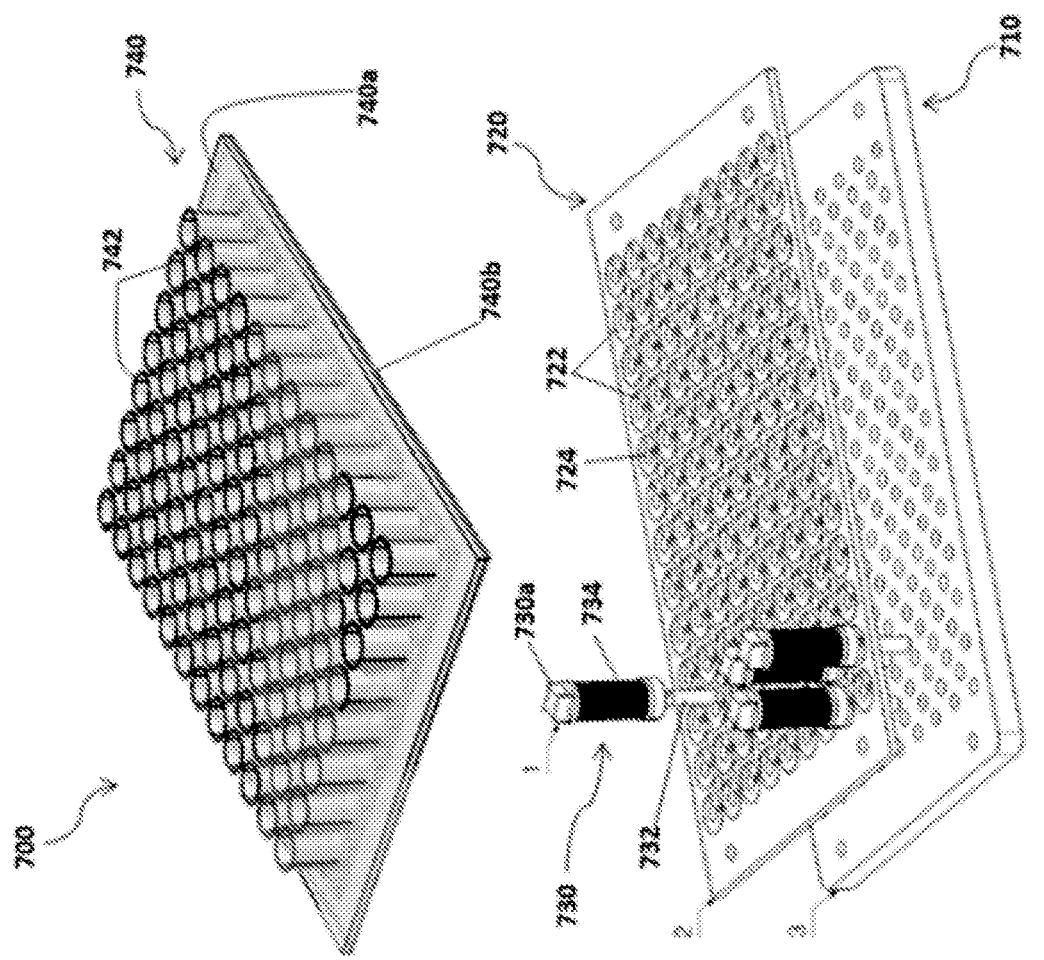

With reference now to FIGS. 7A-B, an exemplary fluid processing system 700 in accordance with various aspects of the present teachings is depicted. With reference first to FIG. 7A, the fluid processing system 700, depicted in exploded view, comprises a base plate 710, a PCB board 720, an plurality of electromagnetic structures 730, and an upper plate 740 defining a plurality of sample wells 740 extending from a substantially planar upper surface 740a thereof. It will be appreciated by a person skilled in the art that that though the upper plate 740 is depicted in FIG. 7A as a 96-well format in which the sample wells have a substantially circular cross-sectional shape, the upper plate 740 can include any number of sample wells 742 exhibiting a variety of cross-sectional shapes and maximum volumes as discussed above. For example, in accordance with the present teachings, each of the open sample wells 742 can be filled or partially-filled with various volumes of the fluid sample, thereby allowing for the reduction or expansion of the sample volume to be processed, depending for example on the availability or expense of the sample and/or on the requirements of a particular assay. It will further be appreciated that the upper plate 740 can be manufactured of any material known in the art or hereafter developed in accordance with the present teachings such as a polymeric material (e.g., polystyrene or polypropylene), all by way of non-limiting example. Additionally, as known in the art, the surfaces can be coated with a variety of surface coatings to provide increased hydrophilicity, hydrophobicity, passivation, or increased binding to cells or other analytes. In some aspects, the bottom surface 740b of the upper plate 740 can be configured to engage (permanently or removably) with the lower portions of the fluid processing system, as discussed below. For example, in some aspects, the bottom surface 740b can include depressions formed therein for engaging the upper end 730a of the electromagnetic structures 730 or bores through which a portion of the electromagnetic structures can extend to be disposed around and about each of the sample wells 742.

With reference now to the lower portions of the fluid processing system 700, FIG. 7A depicts a PCB board 720, a base plate 710, and a plurality of electromagnetic structures 730. As shown, the PCB board 720 comprises a plurality of electrical contacts 722 to which an electrical signal can be applied by a power source (not shown) and to which the electromagnetic structures 730 can be electrically coupled. As otherwise discussed herein, the PCB board 720 can be wired such that each electromagnetic structure can be individually addressed and actuated by a controller through the selective application of electrical signals thereto. Additionally, the PCB board 720 includes a plurality of holes 724 through which a portion of the electromagnetic structures can extend to make electrical contact with the base plate 710. For example, as shown in FIG. 7A, the electromagnetic structures 730 can include a mounting post 732 that extends through the holes 724 when the electromagnetic structures 730 are seated on the electrical contacts 722, and such that conductive leads associated with the mounting posts 732 can be electrically coupled to the base plate 710. As shown, the base plate 710 can include bores corresponding to the mounting posts 732 so as to ensure that the mounting posts 732 are in secure engagement therewith. The base plate 710 can also be coupled to a power supply (or grounded) to complete the circuit(s) such that one or more electrical signals can be applied to the plurality of electrical contacts 722 of the PCB board 720 to allow an electrical current to flow through the electromagnetic structures 730 in accordance with the present teachings. As shown in FIG. 7A, the electromagnetic structures 730 can include an upper post around which is coiled a conductive wire 734 that is electrically coupled to the contacts 722, and which terminates in an upper end 730a. It will thus be appreciated that as current flows between the electrical contacts 722, the wire coil 734, upper end 730a, and the metal base plate 710 (current direction depends on the voltage of the signal applied to the particular contacts 722 of the PCB board 720), the wire coil 734 acts as a solenoid to thereby generate a magnetic field through and about the wire coil 734, the directionality of which is dependent on the direction of the current. The upper end 730a of the electromagnetic structures 730 can have a variety of shapes (e.g., substantially the same cross-section shape as the post around which the wire is coiled), though it has been found that the upper end 730a can be preferentially formed from a conductive material and shaped to correspond to the peripheral surfaces of the sample wells, so as to act as a lens that concentrates the magnetic field and/or increases its uniformity within the sample wells.

As should be appreciated, the examples embodied by FIGS. 1-5 and 7 are directed to apparatuses and methods wherein the magnetic structures are arranged about a fluid container in only a single horizontal layer. In this configuration, the generation of magnetic fields causes mixing of particles in substantially the x-y plane which describes just one aspect of the present teachings. As will be detailed in further embodiments, such systems and methods can be modified in a manner in which additional magnetic fields are generated to cause mixing of particles in the z direction as well.

FIG. 8A schematically depicts an exemplary fluid processing system 800 according to various aspects of some embodiments of the present teachings. As shown in FIG. 8A, the exemplary fluid processing system 800 includes a fluid container 115 and a magnetic assembly 805 configured to generate one or more magnetic field gradients or magnetic forces within the fluid container 115, as discussed in detail below. The fluid container 115 can generally comprise any type of container configured to hold a sample fluid, such as a sample well, a vial, a fluid reservoir, or the like, defining a fluid-containing chamber therein. In some embodiments, the exemplary fluid container 115 may extend from an open, upper end 115a (open to the ambient atmosphere) to a lower, closed end 115b such that the fluid within the fluid container 115 can be loaded and/or removed therefrom by one or more liquid loading/collection devices 135 that can be inserted into the open, upper end 115*a*. It will be appreciated by those skilled in the art that the container 115 can include a removable cap that can be coupled to the open, upper end 115*a* (e.g., an Eppendorf tube) during various processing steps, for example, to prevent the escape of fluid during mixing, contamination, and/or evaporation. Illustrative liquid loading/collection devices 135 may include, without limitation, manual sample loading devices (e.g., pipette), multi-channel pipette devices, acoustic liquid handling devices, and/or an auto-sampler, all by way of non-limiting example. The container 115 contains a plurality of magnetic particles 120.

As shown in FIG. 8B, the magnetic assembly 805 may include a plurality of electromagnet structures 845*a-n*, each of which comprises a horizontal or substantially horizontal layer of electromagnets 810 arranged in a plane normal or substantially normal to the vertical axis of the fluid container 115. As indicated by the number of magnetic structures 845*a-n*, the exemplary magnetic assembly 805 can comprise a plurality of vertically-spaced layers, including 2 electromagnet structures, 3 electromagnet structures, 4 electromagnet structures, 5 electromagnet structures, 10 electromagnet structures, 20 electromagnet structures, or more. Additionally, it will be appreciated that although four electromagnets 810 are depicted as being associated with each electromagnet structure 845 in FIG. 8B (e.g., electromagnets 810*a-d* in magnetic structure 845*a* and electromagnets 810*e-h* in magnetic structure 845*n*), the present teachings are not so limited as any number of electromagnets 810 capable of operating according to various aspects of the applicant's teachings may be used as further described herein.

In some embodiments, the four electromagnets 810 surrounding the fluid container 115 in each layer of the magnetic assembly 805 (e.g., electromagnets 810*a-d* in layer 845*a*) may operate the same as or substantially similar to the quadrupole magnet structure, as described previously in FIGS. 1-5. It will be appreciated that the electromagnets 810*a-h* can include any electromagnet known to those having skill in the art, including, for example, a ferromagnetic-core electromagnet. The electromagnets 810*a-h* can have various shapes, including square, rectangular, round, elliptical, or any other shape capable of operating according to various aspects of the applicant's teachings.

As schematically depicted in FIGS. 8A and 8B, the exemplary fluid processing system 800 additionally includes a controller 825 operatively coupled to the magnetic assembly 805 and configured to control the magnetic fields produced by the electromagnets 810*a-h*. In various aspects, the controller 825 can be configured to control one or more power sources (not shown) configured to supply an electrical signal to the plurality of electromagnets 810*a-h*. In some embodiments, the electrical signal can be in the form of radio frequency (RF) waveforms, DC current, AC current, or the like. Although RF waveforms are generally used herein as an example of waveforms that can be applied to the electromagnets 810*a-h* to promote mixing of the fluid sample, the present teachings are not so limited, as any type of electrical current capable of operating according to various aspects of applicant's teachings are contemplated herein. By way of example, a DC signal can additionally or alternatively be applied to one or more of the electromagnets so as to draw magnetic particles to the perimeter or one side and/or vertical level of the fluid container (and out of the bulk fluid) so as to aid in fluid transfer from the container after the mixing step and/or prevent the aspiration of the magnetic particles, by way of non-limiting example. In various aspects, the controller 825 can be any type of device and/or electrical component capable of actuating an electromagnet. In some embodiments, the controller 825 can operate to regulate the magnetic field produced by each of the electromagnets 810*a-h* by controlling the electrical current passing through a solenoid of each of the electromagnets. In some embodiments, the controller 825 can include or be coupled to a logic device (not shown), processor, and/or a memory, such as a computing device configured to execute an application configured to provide instructions for controlling the electromagnets 810*a-h*. In some embodiments, the application can provide instructions based on operator input and/or feedback from the fluid processing system 800. In some embodiments, the application can include and/or the memory may be configured to store one or more sample processing protocols for execution by the controller 825.

In various aspects, each electromagnet 810*a-h* can be individually addressed and actuated by the controller 825. For example, the controller 825 can supply RF electrical signals of different phases to each of the one or more of the electromagnets 810*a-h* such that one or more of the electromagnets generate a different magnetic field. In this manner, the magnetic field gradient generated by each magnetic structure 845*a-n* within the fluid container 115 can be rapidly and effectively controlled to manipulate the movement of magnetic particles 120 within the sample fluid. In some embodiments, the RF waveforms and the characteristics thereof (e.g., phase shifts) may be applied to the electromagnets 810*a-h* according to the sample processing protocol. It will be appreciated in light of the present teachings that a magnetic assembly 805 can be utilized to manipulate the magnetic particles 120 within the sample fluid in various processes including, without limitation, protein assays, sample derivatization (e.g., steroid derivatization, sample derivatization for gas chromatography, etc.), and/or sample purification and desalting. Following this processing, processed fluid may be delivered to various analytical equipment 140, such as a mass spectrometer (MS) for analysis. In some embodiments, only a single layer of electromagnets 810*e-h* (i.e., magnetic structure 845*n*, e.g., arranged at a height above the bottom 115*b* of the fluid chamber about the periphery of the fluid container) can be actuated to generate a magnetic field within the fluid container 115 that captures and/or suspends the magnetic particles 120 in a particular plane within the fluid container. For example, the magnetic particles 120 can be suspended in a particular plane (e.g., at the level of magnetic structure 845*n*) to move the magnetic particles away from the bottom of the fluid container during a fluid collection process and/or for processing fluids (e.g., reagents) in a plane above material (e.g., cells adhering to the lower surface of the fluid chamber), where contact with the material on the lower surface of the fluid chamber is to be avoided.

In accordance with various aspects of the present teachings, the magnetic assemblies 805 may be incorporated into various fluid processing systems and fluid handling devices. With reference now to FIG. 8C, an exemplary magnetic assembly 805 according to various aspects of the applicant's teachings is depicted as being incorporated into or operating in combination with a sample tray 850, such as a sample plate system. In various aspects, magnetic assemblies 805 can be used for mixing magnetic particles 120 within the sample wells of a sample plate, such as a conventional 4, 8, 12, or 96 well sample plate. In some embodiments, magnetic assembly 805 may be configured to mix magnetic particles 120 within the sample wells of open-well sample plate (i.e., open-to-atmosphere, sealed with a removable covering or cap, and/or partially enclosed). As shown in FIG. 8C, the fluid container 115 (i.e., sample well) of a sample plate 850 may fit down in an area adjacent to the electromagnets 810a-h of a magnetic assembly 805. In various aspects, a sample plate 850 may be placed on a portion of a magnetic assembly 805, such as on a planar surface thereof, such that the sample well 115 may be arranged adjacent to the electromagnets 810a-h of the magnetic structures 845a-n.

With reference now to FIG. 8D, an exemplary magnetic assembly 805 according to various aspects of the applicant's teachings is depicted as a standalone mixing device 860. For instance, a magnetic assembly 805 may be used as the mixing element of a magnetic mixer or as a mixing element of a vortex-type mixer (i.e., replacing the motor-driven mixing element). In some embodiments, the fluid container 115 (e.g., a single vial and/or a sample well of a sample plate) can be pressed against an actuator 865 to initiate the controller 825 to actuate the electromagnets 810a-h according to applicant's teachings.

FIGS. 9A and 9B depict another exemplary illustrative fluid processing system 900 in which at least one of the magnetic structures (i.e., layer 945n of electrodes 910) of the electromagnetic assembly 905 is vertically adjustable according to various aspects of the applicant's teachings. The fluid container 915 can be arranged within a magnetic assembly 905 having a lower magnetic structure 945a (comprising electromagnets 910a-d, only two of which are shown) and an upper magnetic structure 945n (comprising electromagnets 910e-h, only two of which are shown). As shown in FIGS. 9A and 9B, the fluid container 915 is configured to contain different volumes of fluid (having magnetic particles 920 arranged therein), which extend to various heights 940a (as shown in FIG. 9A) and 940b (as shown in FIG. 9B) within the fluid chamber. As shown specifically in FIG. 9A, in a first configuration the magnetic structure 945n can be located at a first height 960a, for example, to effect the magnetic forces generated within the fluid container 915 by the magnetic assembly 905 and/or to optimize mixing of the fluid having a height 940a within the fluid container. It will be appreciated, for example, that the position of the magnetic structure 945n with respect to the magnetic particles 920 and/or other magnetic structures (i.e., magnetic structure 945a) may affect the location, strength, intensity, direction, or other characteristics of the magnetic field gradient generated by the electromagnetic assembly 905 within the fluid container 915. As shown in FIG. 9B, when a volume of fluid having a second height 940b, the upper magnetic structure 945n can be moved or actuated in an upward direction such that the magnetic structure has a height 960b greater than height 960a. In this manner, the magnetic structure 945n can be moved to various heights in order to optimally process fluids of different volumes and/or to alter the characteristics of magnetic field gradients generated in the fluid container 915.

Figure 10:
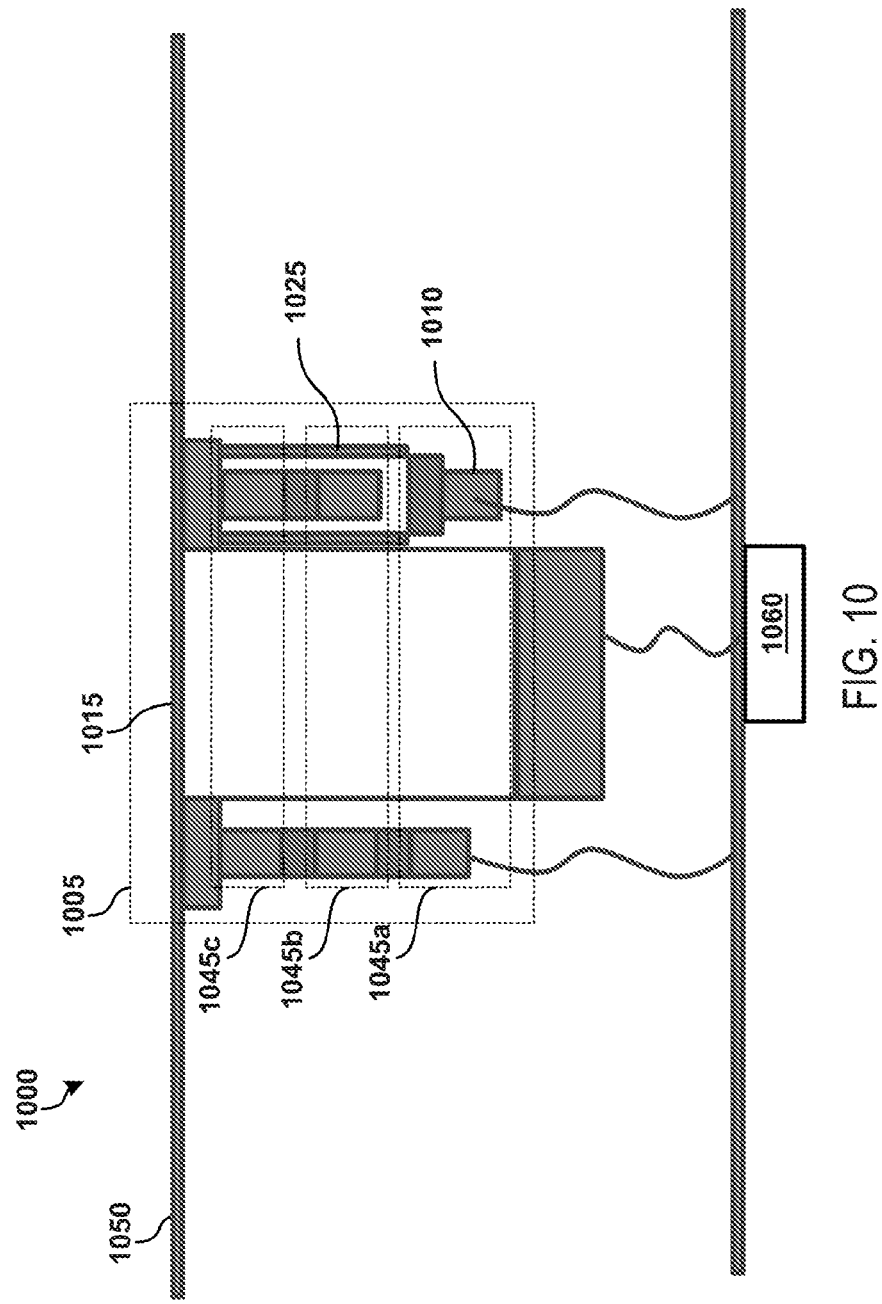
FIG. 10 depicts another illustrative fluid processing system according to various aspects of the applicant's teachings.

By way of example, FIG. 10 depicts another illustrative fluid processing system 1000 according to various aspects of the applicant's teachings in which at least one of the magnetic structures 1045a-c of a magnetic assembly 1005 can be actuated (e.g., moved) to adjust the vertical separation of the magnetic structures so as to accommodate mixing of different volumes of sample fluid within the fluid chamber. As shown in FIG. 10, the fluid processing system 1000 includes a sample tray 1050 having a sample well 1015 surrounded by a plurality of electromagnets 1010 of a magnetic assembly 1005. For example, the magnetic assembly 1005 includes three layers of horizontal magnetic structures 1045a-c, each of which formed from a plurality of electromagnets 1010 (only one of which is labeled to simplify the figure). Additionally, the magnetic assembly 1005 and/or individual magnetic structures 1045a-c include a positioning element 1025 configured to adjust the position of one or more electromagnets 1010 or magnetic structures 1045a-c relative to one another, and/or to adjust the position of the entire magnetic assembly 1005 relative to the sample well 1015. Non-limiting examples of positioning elements 1025 may include rotary actuators, linear actuators, servo-motors, electronic motors, or the like. In some embodiments, the volume of fluid in the sample well 1015 can be measured by measuring device 1060 such that the positioning element 1025 can automatically adjust the position of one or more electromagnets 1010, magnetic structures 1045a-c, and/or the entire magnetic assembly 1005 based on the measured volume of fluid in the sample well 1015 and/or the requirements of the fluid processing protocol. In some embodiments, the positioning element 1025 can be configured to adjust the position of one or more electromagnets 1010, magnetic structures 1045a-c, and/or the entire magnetic assembly 1005 based on user input, manual input, a sample processing protocol, and/or a pre-set volume.

Figure 11A:
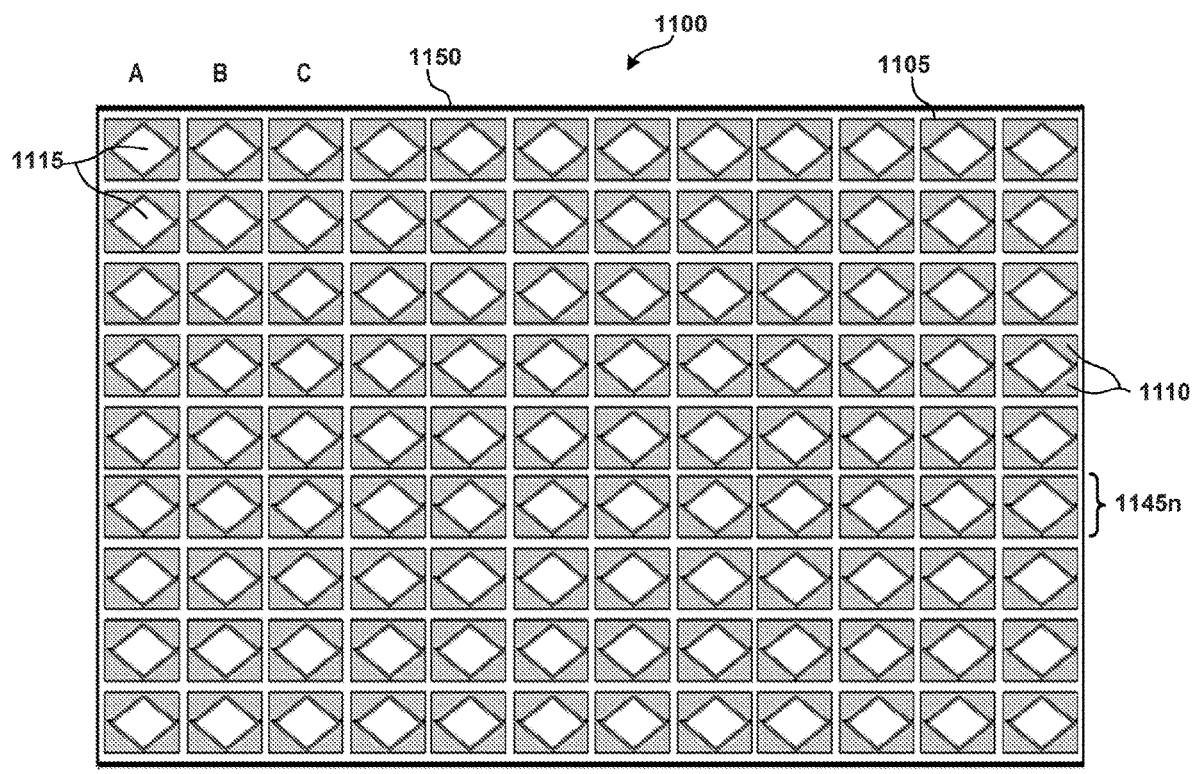
FIG. 11A depicts an illustrative open-well magnetic sample plate and fluid processing system according to various aspects of the applicant's teachings.

With reference now to FIG. 11A, another exemplary fluid processing system 1100 having an open-well magnetic sample plate format according to various aspects of the applicant's teachings is depicted. As shown in FIG. 11A, a 96-well sample plate 1150 can include a plurality of sample wells 1115. Although diamond-shaped sample wells 1115 are depicted, it will be appreciated that the fluid containers in accordance with the present teachings are not so limited. For instance, the sample wells 1115 can have various shapes, including square, rectangular, round, elliptical, or any other shape capable of operating according to various aspects of the applicant's teachings. Furthermore, the fluid container need not contain only static fluid. For example, the fluid container may comprise input and output lines that allow the inflow and outflow of liquid into the container.

Each sample well 1115 is surrounded about its periphery by a magnetic assembly 1105 that includes a plurality of vertically-separated magnetic structures, each of which comprises a plurality of electromagnets 1110 disposed about the periphery of the sample well 1115. As a top-down view of the sample plate 1150, FIG. 11A only depicts the upper-most magnetic structure 1145n of the magnetic assembly 1105; however, the magnetic assembly includes a plurality of magnetic structures as otherwise discussed herein.

In accordance with the present teachings, the magnetic assemblies 1105 and the methods of mixing magnetic particles using RF-driven oscillating magnetic fields can be incorporated into existing sample plate devices, including sample plate devices configured as large, open arrays of sample wells 1115. For example, the magnetic assemblies 1105 can be configured to couple to (e.g., releasably engage) standard sample plate devices, such as industry standard 96-sample well arrays. This may be achieved, for instance, by using electromagnetic assemblies 1105 (and their magnetic structures 1145a-n and electromagnets 1110) having a geometry that corresponds with standard sample well plates. In addition, the use of open-well sample systems provides for more efficient methods for sample loading and collection, such as integration with an auto-sampler and other automated fluid-handling systems. In this manner, fluid processing systems according to various aspects of the applicant's teachings may allow for the simultaneous processing of large arrays of samples that is simple and efficient from a fluid manipulation and a mechanical complexity perspective. Moreover, because fluidic channels and pumps are not required, fluid processing issues relating with these elements, including, without limitation, non-specific binding and carryover can be reduced and even eliminated through the use of a disposable sample plate that can be coupled to the magnetic assemblies.

In various aspects, various reagents, magnetic particles, and/or other process elements may be incorporated into the sample wells 1115 of the sample plate 1150 in order to perform a full assay with reduced sample manipulation. For example, sample wells 1115 in each row or column of the sample plate can include process elements required for a particular assay in order of required use. In an example involving a protein processing assay, pull-down beads can be disposed within the first, leftmost column A of sample wells 1115, ion-exchange beads can be disposed within the second column B of sample wells 1115, and trypsin-coated beads can be disposed within a third column C of sample wells 1115. In this manner, processing of the sample may only require transferring the sample from one column (e.g., column A) to another column (e.g., column B) to perform the protein processing assay, while actuating the electromagnets 1110 surrounding each well appropriately in order to facilitate the processing step performed therein.

Though the fluid chambers of the sample wells 1115 of FIG. 11A are depicted as being fluidically-isolated, it will also be appreciated that the sample plate 1150 can additionally include various liquid handling elements, including fluidic channels, valves, pumps, or the like, to facilitate fluid movement between the various sample wells 1115. In another example, one or more pneumatic-controlled pressure manifolds can be integrated onto the sample plate 1150 to automatically transfer fluid between the sample wells 1115, between a reagent filling port and reagent reservoirs, and/or between reagent reservoirs and the sample wells without requiring moving parts.

Figure 11B:
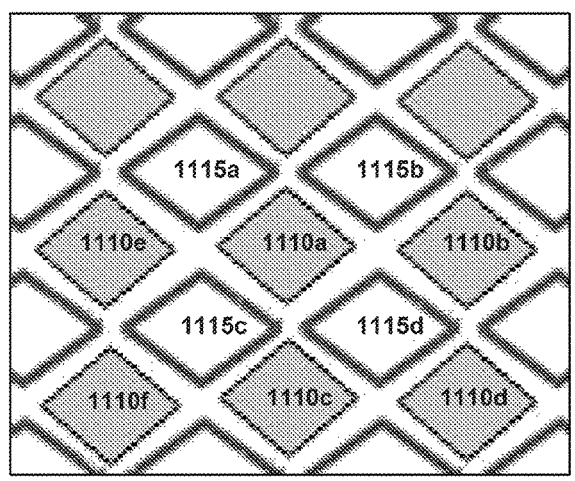
FIG. 11B depicts another illustrative open-well magnetic sample plate and fluid processing system according to various aspects of the applicant's teachings.

In various aspects, each electromagnet 1110 of the magnetic assembly 1105 can be associated with more than one sample well 1115 so as to generate a magnetic field within more than one sample well. For example, as depicted in FIG. 11B, electromagnet 1110a can generate a magnetic field within each of sample wells 1115a-d. Accordingly, in conjunction with electromagnets 1110b-d, electromagnet 1110a can form part of an electromagnetic assembly 1105 with respect to sample well 1115d. Likewise, electromagnet 1110a can form part of an electromagnetic assembly 1105 with respect to sample well 1115c with electromagnets 1110c, 1110e, and 1110f. In this manner, each electromagnet 1110 can be configured to influence the magnetic particles arranged within multiple sample wells 1115a-d. Accordingly, fewer electromagnets 1110 may be used to actuate magnetic particles within a tray of sample wells 1115. For example, only 117 electromagnets 1110 may be required for a 96-well sample plate in accordance with FIG. 11B, compared with 384 electromagnets (96×4) for a 96-well sample tray using four electromagnets for each sample well 1115 as shown in FIG. 11A. Extraction of an entire sample plate may be achieved by actuating alternative rows of electromagnets 1110 within the layers of magnetic structures of each magnetic assembly 1105 in sequence, with a processing time on the order of a few seconds to complete the extraction process for the entire sample plate.

Figure 12:
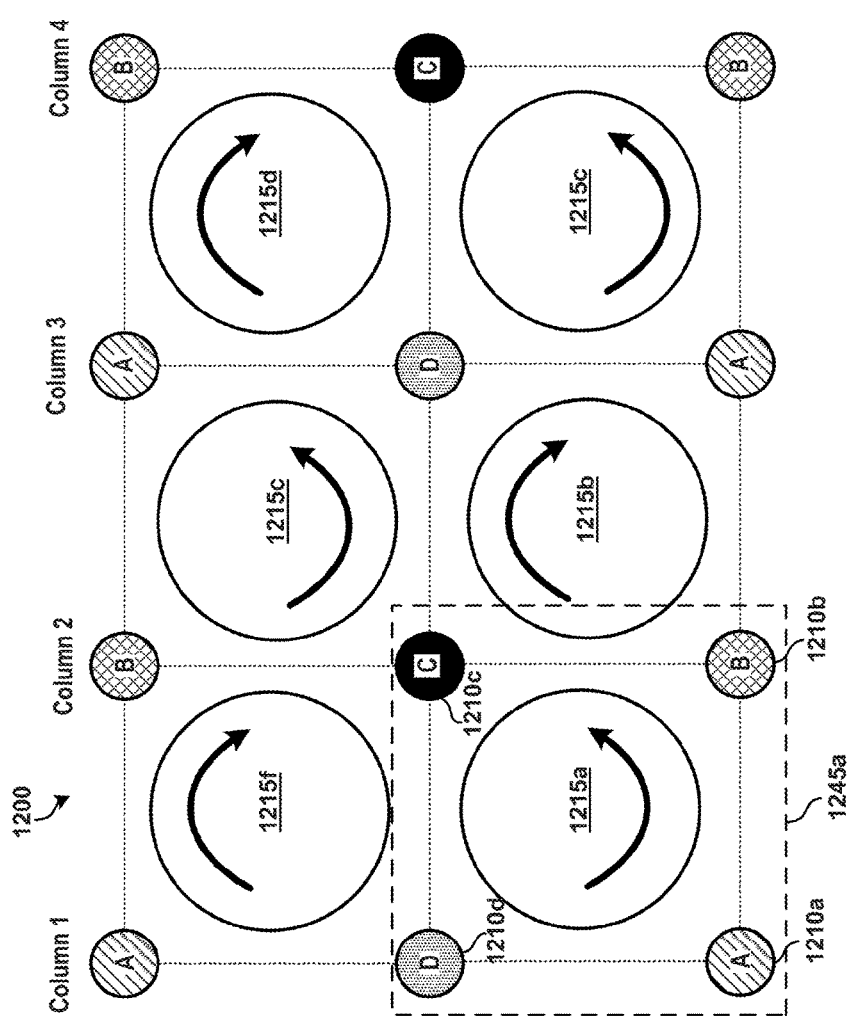
FIG. 12 schematically depicts mixing of the fluid in a single magnetic structure or layer of an exemplary fluid processing system according to various aspects of the applicant's teachings.
Figure 13A:
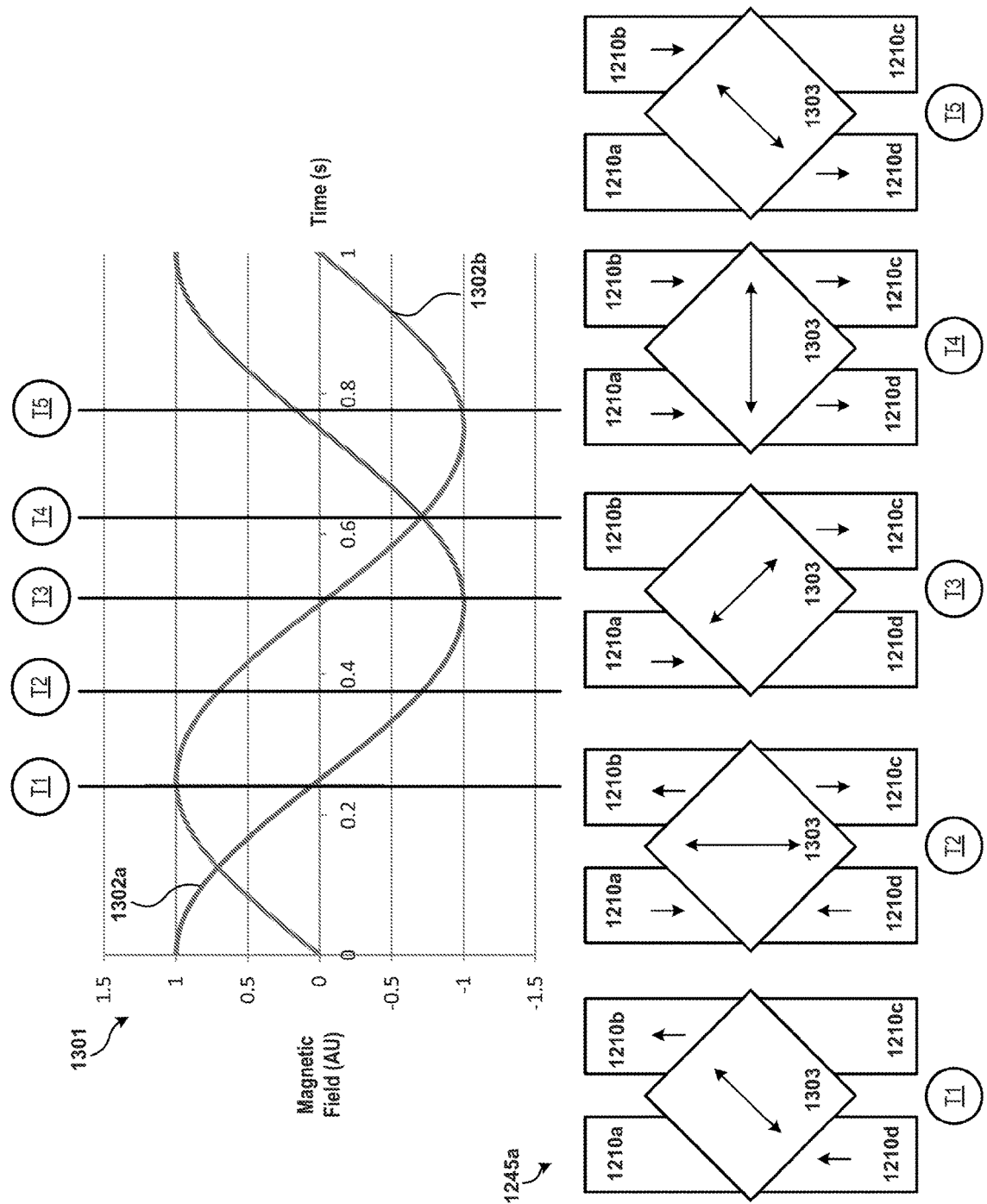
FIGS. 13A and 13B depict exemplary mixing patterns of the fluid processing system of FIG. 12 according to various aspects of the applicant's teachings.
Figure 13B:
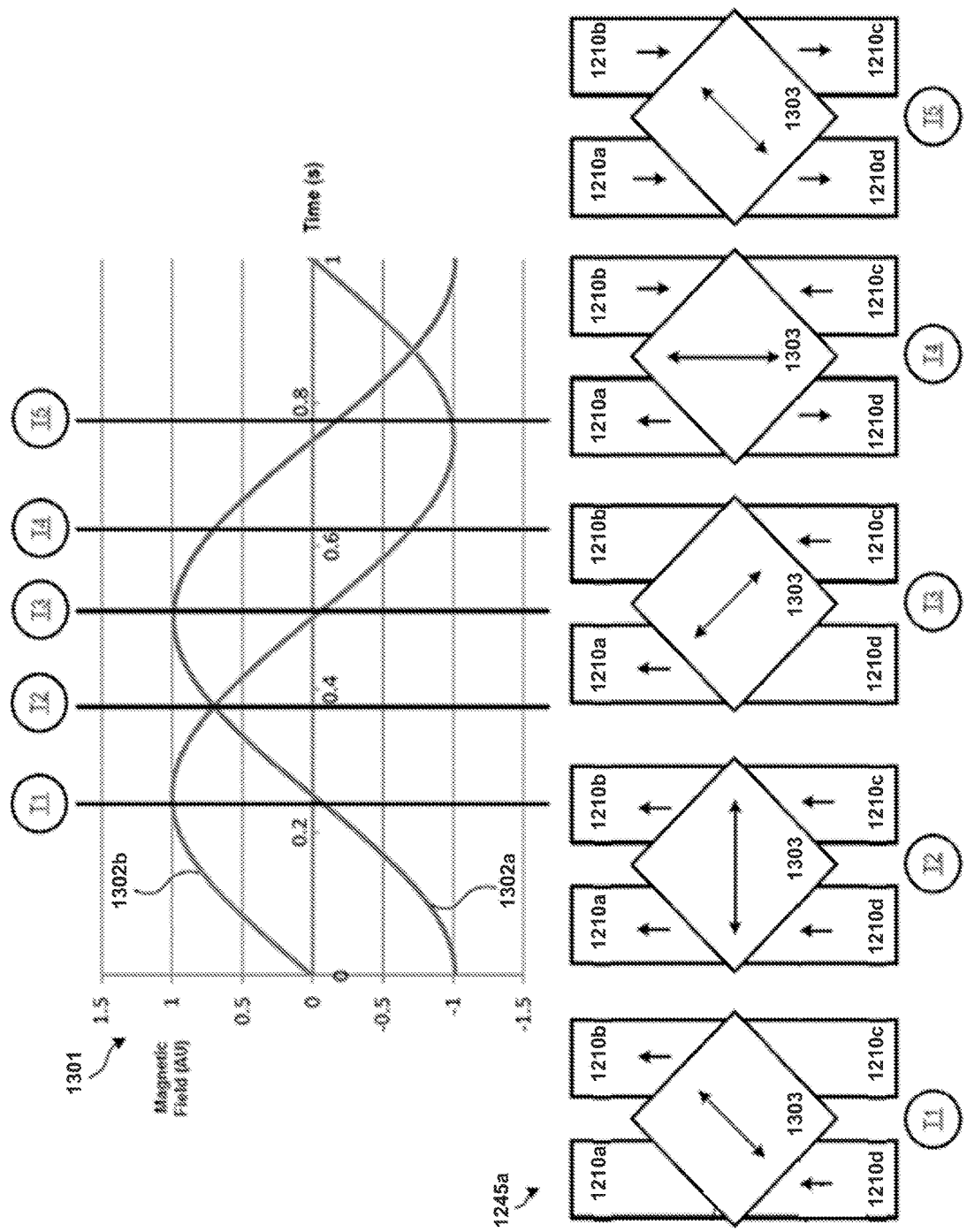

With reference now to FIGS. 12 and 13A-B, exemplary aspects of the mixing of the fluid in a single magnetic structure or layer of an exemplary magnetic assembly will first be described. FIG. 12 schematically depicts a portion of an exemplary fluid processing system 1200 in accordance with various aspects of the present teachings. The exemplary fluid processing system 1200 depicted in FIG. 12 is similar to that depicted in FIG. 11B in that the system 1200 includes a plurality of magnetic assemblies, each of which is partially depicted in FIG. 12 and comprises an upper magnetic structure (not shown) and a vertically-spaced lower magnetic structure 1245a comprising four electromagnets 1210a-d and multiple sample wells 1215a-f. With a focus on the sample well 1215a, the four electromagnets 1210a-d surround the periphery of the sample well 1215a and can be effective to cause mixing in the x-y plane (i.e., the plane of the lower magnetic structure 1245a) via the generation of a magnetic fields within the sample well. The electromagnets 1210a-d can be controlled via the application thereto of RF signals having different phase delays, according to the exemplary phase delay equations (1) (2) (3) and (4) described previously.

As shown in FIG. 12, the various electromagnets 1210 are labeled A-D according to the phase delay equation corresponding to the signal applied to the particular electromagnet. It will be observed that the phase delay between adjacent electromagnets 1210a-d of the magnetic structure 1245a exhibits a ±90° phase shift relative to its adjacent electromagnets within the magnetic structure 1245a. It will nonetheless be appreciated that the present teachings are not so limited, as other phase shift values may be used according to various aspects of the applicant's teachings, such as a 30° phase delay, a 60° phase delay, a 90° phase delay, a 120° phase delay, a 150° phase delay, a 180° phase delay, a 210° phase delay, a 240° phase delay, a 270° phase delay, a 300° phase delay, a 330° phase delay, or the like. In various aspects, the actuation of the electromagnets 1210a-d according to these exemplary phase delay equations causes the magnetic particles (not shown) in sample well 1215a to mix in a counterclockwise motion in the x-y plane. It will also be observed that the particular pattern of RF signals applied to the electrodes in Columns 1-4 similarly results in each sample well to be of the opposite direction in the x-y plane (counterclockwise or clockwise) to the sample wells adjacent thereto. Mixing fluids using magnetic particles agitated according to various aspects of the applicant's teachings causes the magnetic particles to be horizontally dispersed homogeneously within each fluid container.

FIG. 13A depicts the electrodes 1210a-d of the lower layer (i.e., the magnetic structure 1245a) described above with reference to the sample well 1215a of the magnetic assembly 1205 (comprising magnetic structures 1245a and 1245b, etc.) and an exemplary mixing pattern thereof according to various aspects of the applicant's teachings. The graph 1301 depicts the magnetic fields 1302a, 1302b resulting from the application of electric current to the electromagnets 1210a-d of the magnetic assembly 1205a at time intervals T1-T5 according to various aspects of applicant's teachings. In various aspects, the waveforms of the magnetic fields 1302a, 1302b represent sine waves which generate the exemplary, schematic movement of the magnetic particles within the container to facilitate continuous magnetic particle mixing and improved mixing efficiency. The magnetic fields 1302a, 1302b have a 90° phase shift relative to one another, with the magnetic field 1302a corresponding to electromagnets 1210a and 1210c and magnetic field 1302b corresponding to electromagnets 1210b and 1210d. In the illustrative depiction of FIG. 13A, it will be appreciated that the electromagnets 1210a-d are arranged at different locations relative to the fluid sample such that the orientation of the magnetic field generated by each electromagnet generally differs when the same electrical signal is applied thereto. Likewise, because the electromagnetic pairs (i.e., 1210*a* and 1210*c*, and 1210*b* and 1210*d*) are arranged on opposed sides of the fluid sample, the magnetic field generated by the electrode in each pair is in the same direction when an electrical signal of the same magnitude and of opposite phase are applied to the electromagnet in each pair. Thus, when the exemplary sinusoidal electrical signals of eq. (1)-(4) are applied to electromagnets 1210*a-d*, respectively, the resulting magnetic field in the sample fluid will vary over time as schematically depicted in FIG. 13A, with the pair of electromagnets 1210*a* and 1210*c* together generating the magnetic field 1302*a* and the pair of electromagnets 1210*b* and 1210*d* together generating the magnetic field 1302*b* (magnetic field 1302*b* is delayed 90° relative to magnetic field 1302*a*), thereby causing the fluid to experience mixing in a generally counter-clockwise manner due to the movement 1303 of the particles at the various time points as schematically depicted.

It will thus be appreciated in light of the present teachings that different mixing patterns can be effectuated by controlling the RF waveforms applied to the electromagnets of a magnetic structure. For example, with reference to FIG. 13B, another illustrative mixing pattern for the fluid processing structure of FIG. 13A is depicted according to various aspects of the applicant's teachings. As shown, the fluid mixing pattern differs from that shown in FIG. 13A in that the controller is configured to apply the following exemplary RF signals of different phase delays to the electromagnets 1210*a-d*, respectively:

$$I_A = I_0 \sin(ft) \quad \text{eq. (5)},$$

$$I_B = I_0 \sin(ft - \pi/2) \quad \text{eq. (6)},$$

$$I_C = I_0 \sin(ft - \pi) \quad \text{eq. (7)},$$

$$I_D = I_0 \sin(ft + \pi/2) \quad \text{eq. (8)},$$

wherein I=electrical current, f=frequency, and t=time.

As shown in FIG. 13B, when the exemplary sinusoidal electrical signals of eq. (5)-(8) are applied to electromagnets 1210*a-d*, respectively, the resulting magnetic field in the sample fluid will vary over time as schematically depicted, with the pair of electromagnets 1210*a* and 1210*c* together generating the magnetic field 1302*a* and the pair of electromagnets 1210*b* and 1210*c* together generating the magnetic field 1302*b*. In this case, the magnetic field 1302*a* is instead delayed 90° relative to magnetic field 1302*b*, thereby causing the fluid to be mixed in a general clockwise manner due to the movement 1303 of the particles at the various time points as schematically depicted.

Although the sinusoidal RF waveforms applied to each of the four electromagnets 1210*a-d* surrounding the sample well 1215*a* of FIGS. 12A-13B exhibit a ±90° shift relative to the adjacent electromagnets, the present teachings are not so limited. Indeed, it will be appreciated that any type of waveform may be supplied to electromagnets capable of operating according to applicant's teachings. By way of non-limiting example, the number of electromagnets surrounding each fluid container, the phase shifts between adjacent electromagnets (e.g., a 30°, 60°, 90°, 120°, 150°, 180°, 210°, 240°, 270°, 300°, and 330° phase shifts), and the waveform shape can be varied in accordance with variance aspects of the present teachings. Non-limiting examples of electrical current waveforms may include square, rectangular, triangular, asymmetrical, saw-tooth, or any combination thereof. In some embodiments, the type of current supplied to the electromagnets may be modified during operation of a fluid processing system configured according to some embodiments. For instance, at least a portion of the electromagnets may receive an RF waveform with a 90° phase shift, while another portion may receive an RF waveform with a 180° phase shift. In such an embodiment, the phase shift of each portion may be modified during operation of the fluid processing system (e.g., the phase shifts may be switched, synchronized, or the like). In some embodiments, at least a portion of the electromagnets may be operated in parallel, sequence, pulsed, or the like. In various aspects, the current supplied to the electromagnets may be controlled according to a processing protocol. In some embodiments, the processing protocol may be dynamically altered during operation of the fluid processing system based on various factors, such as feedback, operator input, detection of mixing efficiency, analysis results, or the like.

Additionally, as noted above, the electromagnets 1210*a-d* can additionally or alternatively have a DC signal applied so as to generate a static magnetic field so as to draw magnetic particles to one side of the fluid container (and out of the bulk fluid) and to aid in fluid transfer from the container after the mixing step and/or prevent the aspiration of the magnetic particles, by way of non-limiting example.

Figure 14B:
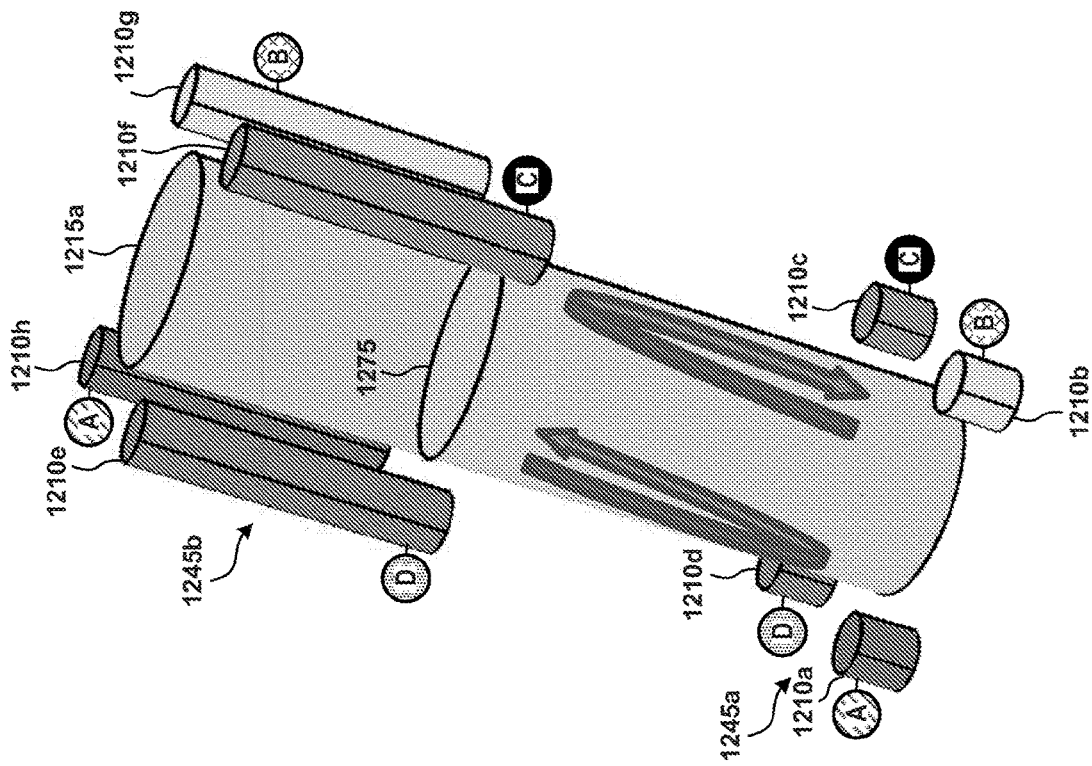
FIGS. 14A-14B depict additional exemplary aspects of the fluid processing system of FIG. 12 according to various aspects of the applicant's teachings.
Figure 14A:
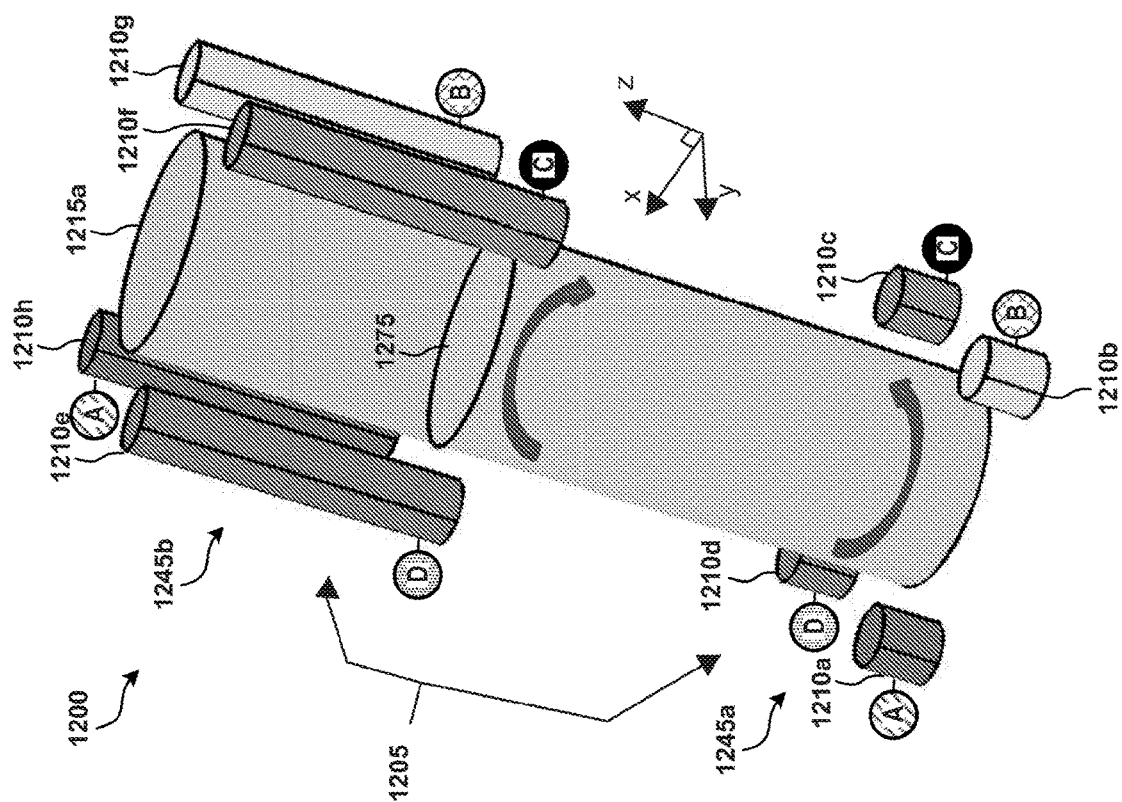

FIGS. 14A and 14B depict additional exemplary aspects of the illustrative large-volume fluid processing system 1200 partially shown above with reference to FIGS. 12 and 13A-B. Whereas the exemplary RF signals and mixing patterns for a single layer of the electrodes 1210 of the magnetic assembly 1205 are discussed above with reference to FIGS. 12 and 13, FIGS. 14A and 14B schematically depict exemplary RF signals and the resulting mixing patterns in one of the sample wells (i.e., sample well 1215*a*) for the magnetic assembly 1205 having two vertically-spaced horizontal magnetic structures 1245*a,b*, etc. in accordance with various aspects of the present teachings. As shown in FIGS. 14A and 14B, the fluid container 1215*a* is disposed within a magnetic assembly 1205 having a lower magnetic structure 1245*a* (comprising electrodes 1210*a-d*) disposed around a lower portion of the container 1215 and an upper magnetic structure 1245*b* (comprising electrodes 1210*e-h*) vertically separated therefrom and disposed around an upper portion of the container 1215. As shown, each electromagnet 1210*a-h* is adjacent two electromagnets in its own structure or layer 1245*a* or 1245*b*, and is vertically adjacent one electromagnet in the other layer. By way of example, electromagnet 1210*a* is adjacent electromagnet 1210*b* and 1210*d* in lower magnetic structure 1245*a*, and is vertically adjacent electromagnet 1210*e* in magnetic structure 1245*b*. As discussed above with reference to FIGS. 12 and 13, the electromagnets 1210*a-d* in lower magnetic structure 1245*a* are labeled A-D according to the exemplary signals (according to the phase delay equations) applied to each electromagnet 1210*a-d* so as to result in the exemplary counter-clockwise mixing in the x-y plane schematically depicted in the lower portion of the fluid volume 1275 of FIG. 14A. Likewise, the electromagnets 1210*e-h* in upper magnetic structure 1245*a* can also have applied thereto the exemplary signals (according to the phase delay equations as labeled A-D), with the signal applied to each electromagnet 1210*e-h* exhibiting a ±90° shift relative to its adjacent electromagnets in the upper magnetic structure 1245*b* so as to result in the exemplary clockwise mixing in the x-y plane schematically depicted in the upper portion of the fluid volume 1275 of FIG. 14A. However, as indicated schematically in FIG. 14B, the pattern of the RF signals applied to the electromagnets 1210*e-h* of the magnetic assembly 1205 can also be effective to generate magnetic field gradients in the z-direction, thereby additionally resulting in the vertical mixing of the magnetic particles as depicted schematically in FIG. 14B. Specifically, in the exemplary depiction of FIGS. 14A and 14B, each electromagnet 1210a-d of one layer is vertically adjacent one electromagnet 1210e-h from the other layer (i.e., magnetic structure 1245b or 1245a), with the signal applied to each exhibiting a ±90° shift relative to its vertically-adjacent electromagnet. In the exemplary magnetic assemblies 1205 depicted in FIGS. 12-14, for example, the signals applied to the electrodes of the lower magnetic structure 1245a as indicated by Column 2 can be shifted one column to the left for the upper magnetic structure 1245b (and Column 3 can likewise be shifted one column to the left), thereby resulting in the pattern of signals applied to the electromagnets of the upper magnetic structure and the schematic mixing patterns depicted in FIGS. 14A and 14B. That is, the different signals applied to the electromagnets 1210 (e.g., electromagnets 1210a-d) relative to the other electromagnets in a single layer (e.g., within the lower magnetic structure 1245a) can generate magnetic field gradients primarily in the x-y plane, while the different signals applied to the vertically-adjacent electromagnets 1210 (e.g., electromagnet 1210a and 1210e) of the different magnetic structures (e.g., between the lower magnetic structure 1245a and the upper magnetic structure 1245b) can result in magnetic field gradients exhibiting a z-direction or vertical component. In this manner, the magnetic particles can be influenced to rotate, spin, move horizontally side-to-side, and/or vertically up-and-down within the fluid sample by the combined effect of the magnetic field gradients generated by the various electromagnets 1210a-h. Mixing fluids using magnetic particles agitated according to various aspects of the applicant's teachings causes the magnetic particles to be dispersed homogeneously vertically and horizontally within each fluid container, providing for optimal exposure and enhanced mixing with the fluid. Though any number of mixing patterns can be provided by altering the phase and/or amplitude of the RF signal applied to each of the electromagnets 1210a-h in accordance with the present teachings, it will also be recognized that the reversed mixing directions at the different layers (e.g., counterclockwise in the lower layer and clockwise in the upper layer in the x-y plane as indicated in FIG. 14A) and in the various fluid columns (e.g., in the z-direction as indicated in FIG. 14B) can especially enhance mixing of the fluid contained within the container 1215a.

With reference now to FIGS. 15A-15D another exemplary processing protocol using the fluid processing system 1200 depicted in FIGS. 12-14 is depicted in accordance with various aspects of the applicant's teachings. Specifically, FIG. 15A depicts the configuration for the horizontal and vertical mixing of the magnetic particles in sample fluid volume 1240a contained within the sample well 1215a as described above with specific reference to FIGS. 14A and 14B. In FIG. 15B, however, the signals applied to the electromagnets are altered such that the vertically-adjacent electromagnets 1210 of the different magnetic structures 1245 (e.g., electrode 1210a of the lower magnetic structure 1245a and electrode 1210e of the upper magnetic structure 1245b) are the same so as to suspend the magnetic particles, for example, on a side of the fluid container 1215 at a fluid level corresponding to the vertical separation between the lower and upper magnetic structures 1245a,b. Isolation of the magnetic particles as depicted in FIG. 15B, for example, may facilitate a liquid extraction process. Following extraction of fluid from the sample well 1215a, additional fluid (e.g., a different sample and/or additional reagents) can then be added. Alternatively or additionally, as depicted in FIG. 15C, the upper magnetic structure 1245b can then be lowered relative to its position in FIGS. 15A and 15B, such that the captured magnetic particles 1220 can then be re-suspended and mixed within the reduced volume 1240b as shown in FIG. 15D.

FIGS. 16A-16C depict the side view of another exemplary fluid processing system 1600 according to various aspects of the applicant's teachings. As shown in FIG. 16A, a fluid container 1615 containing a volume 1640a of fluid may be arranged within the exemplary magnetic assembly 1605. The magnetic assembly 1605 is similar to that depicted in FIG. 12 but differs in that it includes three layers of vertically-spaced magnetic structures 1645a-c having electromagnets 1610a-d (of which only 1610a and 1610b are visible), 1610e-h (of which only 1610e and 1610f are shown), and 1610i-l (of which only 1610i and 1610j are visible). In one mixing configuration, for example, each of the visible electromagnets 1610a, 1610b, 1610e, 1610f, 1610i, and 1610j would have signals corresponding to the exemplary phase delay equations (1) and (2) discussed above (as labeled A or B in FIGS. 16A-16C), while electromagnets 1610c, 1610d, 1610g, 1610h, 1610k, and 1610l (not shown) would have signals corresponding to phase delay equations (3) and (4) applied thereto such that each electrode within a given horizontal structure 1645a-c is adjacent electromagnets having a ±90° phase shift relative thereto.

In general, FIGS. 16A-16C depict the actuation of the different magnetic structures 1645a-c based on the volume 1640a-c of fluid 1635 in the fluid container 1615 so as to mix in the x-y plane at various levels within the fluid volume. In addition, FIGS. 16A-16C depict concurrent activation of more than one electromagnetic structure 1645a-c to effectuate mixing in multiple directions, including in the x-y direction and the z-direction. In FIG. 16A, for example, only the lowest magnetic structure 1645a is activated as the fluid volume 1640a is relatively low, and vertical mixing is not required. Activation of magnetic structure 1645a alone may produce a magnetic field causing mixing of magnetic particles in the fluid in the x-y direction. In FIG. 16B, however, the volume 1640b has increased and electromagnets 1610e-h of electromagnetic structure 1645b have additionally been activated. Accordingly, a magnetic field gradient may be generated that causes mixing of magnetic particles in the fluid in the x-y direction (e.g., due to the magnetic field generated by electromagnets 1610e-h within the same magnetic structure 1645b) and in the z-direction (e.g., due to the magnetic field generated by electromagnets 1610a and 1610e within different magnetic structures 1645a,b). In FIG. 16C, the volume 1640c is further increased and the magnetic structure 1645c has additionally been activated. Accordingly, a magnetic field gradient may be generated that causes mixing of magnetic particles in a horizontal and vertical direction throughout the entire fluid volume 1640c. In some aspects, the signals applied to one or more of the structures 1645a-c can be selectively deactivated so as to result in the magnetic particles preferentially being maintained at a given fluid level within the volume. By way of example, the top layers of the fluid volume can be preferentially mixed while limiting disturbance to the lower layer by only applying the signals depicted in FIG. 16C to the top and middle magnetic structures 1645b,c, while providing no signal to the bottom magnetic structure 1645a so as not to disturb cells being cultured on the bottom surface of the sample well 1615.

With reference now to FIGS. 17A-17C another exemplary processing protocol using the fluid processing system 1600 depicted in FIG. 16 is depicted in accordance with various aspects of the applicant's teachings. FIG. 17A, for example, depicts the mixing of a fluid volume 1640c in accordance with various exemplary aspects of the present teachings and as described with reference to FIG. 16C above in which: 1) each of the electromagnets 1610a, 1610f, and 1610i has a signal corresponding to the exemplary phase delay equation (1) applied thereto (indicated by the A in FIG. 17A); 2) each of the electromagnets 1610b, 1610e, and 1610j has a signal corresponding to the exemplary phase delay equation (2) applied thereto (indicated by the B in FIG. 17A); 3) each of the electromagnets 1610c, 1610h, and 1610k (not shown) would have signals corresponding to phase delay equation (3) applied thereto; and 4) each of the electromagnets 1610d, 1610g, and 1610l (not shown) would have signals corresponding to phase delay equation (4) applied thereto such that each electrode within a given horizontal structure 1645a-c were adjacent electromagnets having a ±90° phase shift relative thereto and vertically adjacent to an electromagnet in a different horizontal structure 1645a-c exhibiting a ±90° phase shift relative thereto. As discussed otherwise herein, such a configuration as depicted in FIG. 17A would result in magnetic field gradients that cause mixing of magnetic particles in a horizontal and vertical direction throughout the entire fluid volume 1640c. Upon completion of the mixing and/or the desired reaction, the signals applied to lower and upper magnetic structures 1645a,c can be deactivated, while the signal applied to the electromagnets 1610e-h of the middle magnetic structure 1645b can be altered to capture the magnetic particles 1620 against the wall of the sample well 1615 at the level of the middle magnetic structure (e.g., through the application of a DC voltage or a signal of the same phase to each of electromagnets 1610e-h) so as to facilitate a liquid extraction process. Following extraction of fluid from the sample well 1615, a lower volume of fluid 1640b can be added to the sample well 1615 and the captured magnetic particles can then be re-suspended and mixed within the reduced volume 1640b as shown in FIG. 17C.

Figure 18:
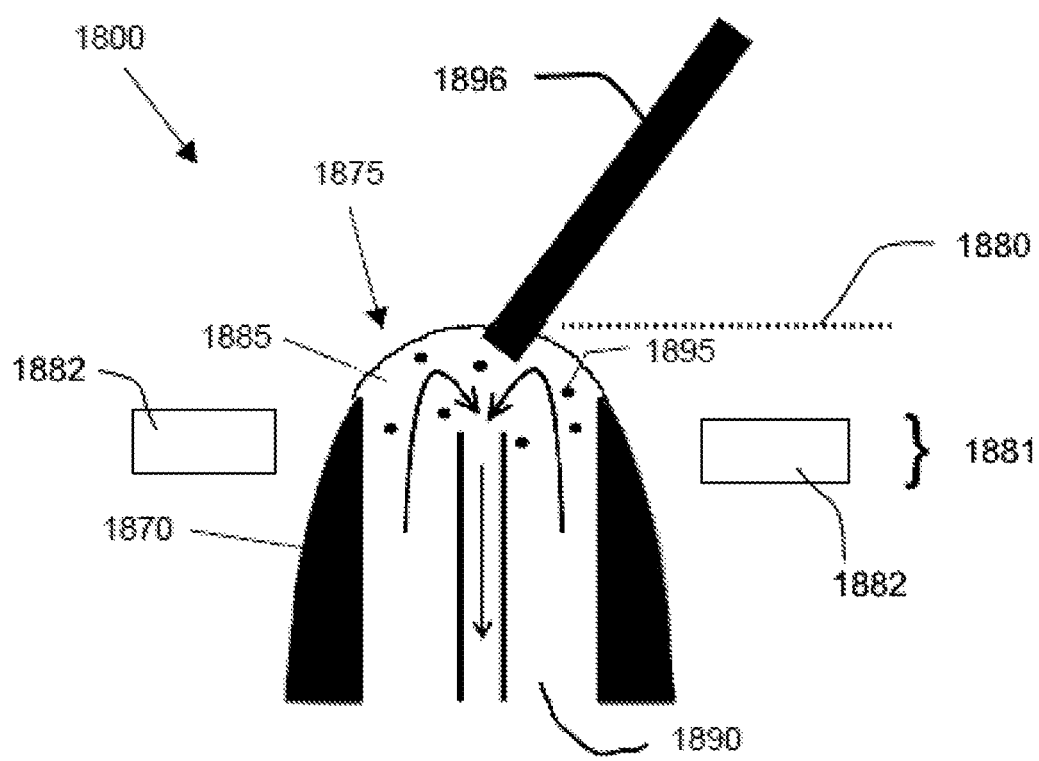
FIG. 18 depicts another exemplary embodiment of an open port probe.

In another example, the fluid processing systems described herein can be utilized in fluid containers that do not contain static amounts of liquid. Now with reference to FIG. 18, the fluid processing systems herein described can be utilized to implement mixing of magnetic particles in an open port probe device, such as those described in U.S. Provisional Application Ser. No. 62/329,870, filed on Apr. 29, 2016, hereby incorporated by reference and also described in Abstract and/or Poster "Coupling Solid-Phase Micro-Extraction (SPME) to Mass Spectrometry via an Open-Port Probe (OPP) Sampling Interface", Chang et al. at 21$^{st}$ International Mass Spectrometry Conference, Toronto, incorporated by reference The open port probe 1800 comprises a tube 1870 having an open ended tip 1875 that is configured to both introduce and extract solvent 1885 on a continuous basis providing a steady state level 1880 of solvent at the tip end 1875. In this particular example, the open port probe 1800 comprises a first cylindrical member disposed within a second cylindrical member arranged in a co-axial arrangement. The solvent 1885 travels towards the tip end 1875 through the annular space 1890 between the two cylindrical members and then travels away from the tip end 1875 through the inner cylinder as depicted in the arrows in the figure defining the fluid path. As should be appreciated, if no inflow or outflow of fluid is present, the solvent 1885 level will remain steady and in many respects, the open port probe 1800 will operate in a similar manner to the other fluid containers described previously, such as a vial. The open port probe 1800 can be used to extract analytes from a substrate surface that comes into contact with the solvent 1885 at the tip 1875. In several embodiments, small magnetic particles 1895 can be introduced into the solvent at the tip 1875 of the open port probe 1880 and in combination with the fluid processing systems and magnetic assemblies and/or structures 1881, comprising electromagnets 1882 herein described, the magnetic particles can be influenced to resist the outflow of solvent 1885 from the tip end 1875 and remain in the vicinity of the tip end by virtue of the presence of the magnetic fields. In addition, the magnetic assemblies and/or structures cause the magnetic particles to spin, or travel back and forth in x y and z directions as confined by the presence of the magnetic fields. While the electromagnetics can typically be chosen to be sufficiently strong to prevent any escape of magnetic particles from the tip surface, a downstream permanent magnetic (not shown) can also be used to capture magnetic particles, thereby preventing any downstream analysis from contamination. The presence of the magnetic particles 1895 at the open port probe tip 1875 can assist in the mass transfer of analytes (or portions thereof) from a substrate surface into the solvent. In an embodiment, the substrate surface that comes into contact with the solvent may comprise a Solid Phase Microextraction (SPME) fibre 1896. The SPME fibre 1896 can contain an embedded analyte which is extracted (or desorbed) into the solvent 1885 upon contact. The substrate surface may be any material configured to hold an analyte sample, and can include various examples such as a mesh material or blade like surface.

While cylindrical members have been described above in describing the tube, it should be appreciated that other shapes with varying cross-sectional shapes may also be utilized include triangular, square, rectangular or any other multi-sided shape.

The presence and mixing of the magnetic particles 1895 may also assist in the disruption of bubbles that may generate at the open port probe tip 1875. These may be caused for example by the usage of compressed gas driven pumps that are utilized to deliver solvent into the open port probe. The outflow of solvent containing an analyte to be analyzed can then be processed downstream using one or more suitable analytical instruments (eg. Mass spectrometer, detector, etc.)

The magnetic assemblies and/or magnetic structures that comprise electromagnets may be placed outside of the metal tube or may be part of the metal tube itself and directly integral to metal at or near the tip.

While this particular embodiment describes the mass transfer of an analyte from a substrate surface to the solvent, it should be appreciated that the within teachings may also be used to assist in the mass transfer in the reverse direction, that is transfer of an analyte (or a portion thereof) from a fluid sample to a substrate surface that has an affinity for the analyte. For example, such as the case for when a biological fluid sample may contain an analyte of interest that is to be transferred to a solid substrate surface that is to be further processed or directly analyzed. The biological fluid sample may be blood, saliva, urine, sweat, plasma, etc.

It should be appreciated that teachings described herein can be modified and adapted to meet specified needs as can be determined by ordinary skilled persons.

Figure 6:
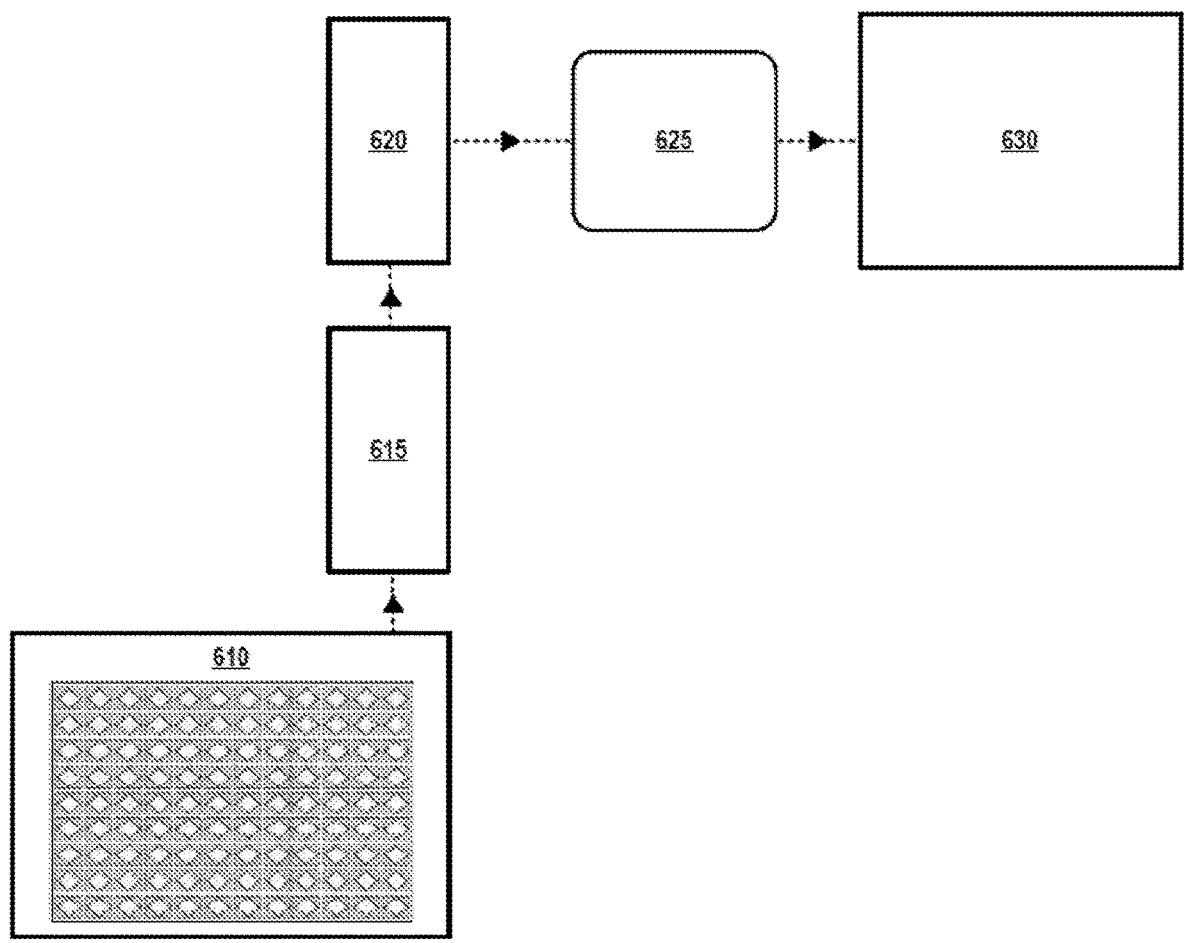
FIG. 6 depicts an illustrative fluid processing and analysis system according to various aspects of the applicant's teachings.

The magnetic structures and fluid processing systems described in accordance with the applicant's present teachings can be used in combination with various analysis equipment known in the art and hereafter developed and modified in accordance with the present teachings, such as an LC, CE, or MS device. With reference now to FIG. 6, one illustrative fluid processing and analysis system according to various aspects of the applicant's teachings is schematically depicted. As shown in FIG. 6, a fluid processing system 610 can be configured to process fluid samples using magnetic structures and an open-well sample plate in accordance with some embodiments. The processed fluid can be collected from the fluid processing system 610 using any of a manual sample loading device (e.g., pipette, a multi-channel pipette) or various automated systems such as a liquid handling robot, an auto-sampler, or an acoustic liquid handling device (e.g., Echo® 525 liquid handler manufactured by LabCyte, Inc. of Sunnyvale, Calif.), all by way of non-limiting example. The processed fluid may be transferred using various fluid transfer devices, such as a vortex-driven sample transfer device. As noted above, the sample removed from one sample well can be added to a different sample well on the plate for further processing steps or can be delivered to the downstream analyzer. For example, in some aspects, the processed sample can be delivered to an LC column 615 for in-line LC separation, with the eluate being delivered to the ion source 620 for ionization of the processed analytes, which can be subsequently analyzed by a DMS 625 that analyzes the ions based on their mobility through a carrier gas and/or a mass spectrometer 630 that analyzes the ions based on their m/z ratio. In some aspects, processed samples can be transferred directly to an ion source 615, with separation being provided by a differential mobility spectrometer (DMS) assembly, for example, in-line with a MS as described in U.S. Pat. No. 8,217,344. Fluid processing systems described in accordance with the applicant's present teachings in combination with a DMS assembly for chemical separation may eliminate the need for a LC (or HPLC) column for processing samples for MS analysis. In various aspects, processed samples may be introduced into analytical equipment, such as an MS, using a surface acoustic wave nebulization (SAWN) apparatus, an electrospray ionization (ESI) device, and a matrix assisted inlet ionization (MAII) source.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

The invention claimed is:

1. A fluid processing system, comprising:
a sample tray comprising a plurality of fluidically-isolated fluid containers, each of the fluid containers for containing a fluid and a plurality of magnetic particles, each of the fluid containers extending from a lower, closed end to an upper, open end that is configured to be open to the atmosphere to receive a fluid to be processed therethrough;
a plurality of magnetic structures, each fluid containers having a magnetic structure associated therewith, each magnetic structure comprising four electromagnets that are adjacent to, and surround, a periphery of a respective one of the fluid containers at a first vertical position, and wherein each of the four electromagnets of each magnetic structure are equidistant to the fluid container associated therewith, each of the four electromagnets from each of the magnetic structures being capable to generate a magnetic field within the associated fluid containers, and wherein at least one electromagnet of each magnetic structure is capable of simultaneously influencing the magnetic particles arranged within four adjacent fluid containers that are adjacent to and surround at least one electromagnet of each magnetic structure; and
a control component coupled to the plurality of magnetic structures, the control component being capable to controlling the magnetic field generated by each of the four electromagnets for each magnetic structure that surrounds and is at the periphery of each fluid container to generate a magnetic field gradient within the each fluid container sufficient to magnetically influence the plurality of magnetic particles within the fluid in the each fluid container, and wherein at least a one of the four electromagnets from each magnetic structure is shared between four magnetic structures from the plurality of magnetic structures such that the one of the four electromagnets from each magnetic structure is capable of simultaneously generating magnetic field gradients within four adjacent fluid containers of the plurality of fluid containers;
wherein the control component is capable of controlling the magnetic field generated by each of the four electromagnets from each of the plurality of magnetic structures via applying at least one electrical signal waveform to the each of the four of electromagnets from the each of the plurality of magnetic structures, with the electrical signal waveform including a radio frequency waveform or an AC current waveform, and wherein the at least one electrical signal waveform applied to the each of the four electromagnets has a phase delay relative to other electrical signal waveforms applied to other of the four electromagnets of a particular one of the plurality of magnetic structures, and relative to electrical signal waveforms applied to electromagnets of magnetic structures that are adjacent to the particular one of the plurality of magnetic structures.

2. The system of claim 1, wherein the sample plate comprises a bottom surface comprising depressions configured to removably engage at least a portion of the electromagnetic structures.

3. The system of claim 1, wherein the phase delay is a 90° phase delay.

4. The system of claim 1, wherein the phase delay is a 180° phase delay.

5. The system of claim 1, wherein the plurality of electromagnets comprise a first electromagnet, a second electromagnet, a third electromagnet, and a fourth electromagnet, wherein the at least one radio frequency waveform is applied to each of the plurality of electromagnets according to:

$$I_{first\ electromagnet}=I_0\sin(ft),$$

$$I_{second\ electromagnet}=I_0\sin(ft+\pi/2),$$

$$I_{third\ electromagnet}=I_0\sin(ft+\pi),\ \text{and}$$

$$I_{fourth\ electromagnet}=I_0\sin(ft+3\pi/2),$$

wherein I is electrical current, f is frequency, and t is time.

6. The system of claim 1, wherein the fluid chamber is configured to hold a maximum volume in a range of about 1 mL to about 10 mL.

7. The system of claim 1 wherein the magnetic structure also comprises an additional four electromagnets that are arranged around the one of the fluid containers at a second vertical position.

8. The system of claim 1, wherein an upper end of each magnetic structure is shaped to correspond to a peripheral surface of the one of the fluid containers so as to act as a lens that concentrates the magnetic field.

\* \* \* \* \*